(12) United States Patent
Coates et al.

(10) Patent No.: US 9,596,252 B2
(45) Date of Patent: *Mar. 14, 2017

(54) IDENTIFYING POSSIBLE SECURITY THREATS USING EVENT GROUP SUMMARIES

(71) Applicant: Splunk Inc., San Francisco, CA (US)

(72) Inventors: John Coates, Berkeley, CA (US); Lucas Murphey, Wadsworth, IL (US); David Hazekamp, Tinley Park, IL (US); James Hansen, San Ramon, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,999

(22) Filed: Feb. 29, 2016

(65) Prior Publication Data

US 2016/0182546 A1    Jun. 23, 2016

Related U.S. Application Data

(63) Continuation of application No. 14/280,311, filed on May 16, 2014, now Pat. No. 9,276,946, which is a
(Continued)

(51) Int. Cl.
*G06F 11/00* (2006.01)
*H04L 29/06* (2006.01)
*G06F 21/55* (2013.01)

(52) U.S. Cl.
CPC ........ *H04L 63/1416* (2013.01); *G06F 21/554* (2013.01); *H04L 63/1408* (2013.01);
(Continued)

(58) Field of Classification Search
CPC ...................... G06F 21/50; G06F 21/55–21/56
(Continued)

(56) References Cited

U.S. PATENT DOCUMENTS 9,276,946 B2    3/2016   Coates et al.
2006/0168331 A1*  7/2006   Thompson .............. G06F 9/542
                                                    709/238
(Continued)

OTHER PUBLICATIONS

U.S. Appl. No. 14/280,311, Non-Final Office Action dated Oct. 21, 2015.
(Continued)

*Primary Examiner* — Anthony Brown
(74) *Attorney, Agent, or Firm* — Wong & Rees LLP; Kirk D. Wong

(57) ABSTRACT

A disclosed computer-implemented method includes receiving and indexing the raw data. Indexing includes dividing the raw data into time stamped searchable events that include information relating to computer or network security. Store the indexed data in an indexed data store and extract values from a field in the indexed data using a schema. Search the extracted field values for the security information. Determine a group of security events using the security information. Each security event includes a field value specified by a criteria. Present a graphical interface (GI) including a summary of the group of security events, other summaries of security events, and a remove element (associated with the summary). Receive input corresponding to an interaction of the remove element. Interacting with the remove element causes the summary to be removed from the GI. Update the GI to remove the summary from the GI.

27 Claims, 14 Drawing Sheets

Related U.S. Application Data continuation of application No. 13/956,285, filed on Jul. 31, 2013, now Pat. No. 8,752,178.

(52) U.S. Cl.
CPC .... *H04L 63/1433* (2013.01); *G06F 2221/034* (2013.01); *H04L 63/20* (2013.01)

(58) Field of Classification Search
USPC ..................................................... 726/22–25
See application file for complete search history.

(56) References Cited

U.S. PATENT DOCUMENTS

| | | | | |
|---|---|---|---|---|
| 2008/0229422 A1* | 9/2008 | Hudis | ................... | G06F 21/552 |
| | | | | 726/25 |
| 2011/0055590 A1* | 3/2011 | Lee | ......................... | G06F 21/31 |
| | | | | 713/189 |
| 2011/0083180 A1* | 4/2011 | Mashevsky | ............. | G06F 21/55 |
| | | | | 726/23 |
| 2015/0040225 A1 | 2/2015 | Coates et al. | | |

OTHER PUBLICATIONS

U.S. Appl. No. 14/280,311, Notice of Allowance dated Jan. 21, 2016.

\* cited by examiner

IDENTIFYING POSSIBLE SECURITY THREATS USING EVENT GROUP SUMMARIES

CROSS-REFERENCE TO RELATED APPLICATIONS; PRIORITY CLAIM

This application claims benefit under 35 U.S.C. §120 as a Continuation of U.S. application Ser. No. 14/280,311, filed on May 16, 2014, which claims benefit as a Continuation of U.S. application Ser. No. 13/956,285, filed on Jul. 31, 2013, the entire contents of each of the aforementioned applications is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates generally to computer-implemented systems and methods for managing data associated with events in a security information and event management environment.

BACKGROUND

A security management system, such as a security information and event management (SIEM) system, provide a computing environment that enables real-time analysis of security-related events generated based computing activity. A SIEM system may also provide analytical tools having a range of functions including trend analysis, event identification, and alerting.

Despite having an implemented SIEM system, enterprises continue to battle a host of security vulnerabilities in their information technology (IT) systems as distributed computing systems are rapidly adopted and expanded by the enterprises. With an expansion of distributed computing systems comes additional security issues due to the addition of the new components and the communications between these components. Such changes may introduce new challenges for monitoring and analyzing security events based on activity occurring in the distributed computing systems.

Often, a user of a STEM system may be presented with large amounts of data relating to security events occurring in the system. Left with a difficult task of sorting through the data to identify significant, or noteworthy events, the user faces an additional challenge of indicating or flagging events to be distinguished from each other. The user may be desire to exclude events of little relevance or alternatively may wish to flag events of importance such as those relating to potential security threats. It may be useful for an analyst to be provided with a tool that, besides presenting information related to events, enables the analyst to filter such events to efficiently identify important events, such as those related to a security threat.

SUMMARY

In accordance with the teachings provided herein, systems and methods are disclosed for monitoring and filtering events in a security event management system or a security information and event management system (STEM). More specifically, these systems and methods may improve efficiency for identifying and filtering events that are related to a potential security threat requiring further investigation. The events may be based on computer activity including access control to a system, activity at an endpoint in a system, and/or network activity. Events may be identified in raw data (e.g., machine data, unstructured data, and/or weblogs) based on a time stamp. Each event may be stored as a time-based event in a data store (e.g., a time-series data store) using an appropriate index corresponding to a time stamp of the event. The time stamped stored events may include information related to computer security or network security, such as network information (e.g., http agent strings, network traffic size, a length of a uniform resource locator string, byte count per request, domain names, or a source address), access control information (e.g., login/logout information or access failures), or endpoint information (e.g., malware infections, system configurations, or system states).

To facilitate identification of security-related events (e.g., events that may be relevant to computer or network security), a disclosed system may perform further processing on time stamped events to identify events having information related to computer or network security. The information related to computer or network security may include any information that is useful for analysis of the time stamped event to identify a potential issue with security. For example, the security information may include http user agent strings, network traffic size, a length of a uniform resource locator string, byte count per request, domain names, or source address, any of which may indicate or be used to determine whether a time stamped event poses a security threat. Field values may be extracted from indexed data corresponding to the time stamped events, and then searched for the security information to identify security related events.

The events identified based on the security information may be grouped together based on one or more fields in each of the events satisfying a criteria for a group of security-related events. The criteria may be defined based on one or more fields that contain information useful indicative of a potential security threat. A group of security-related events that include these fields may be useful for identifying a source of such malicious activity. Thus, groups of security-related events may indicate a relationship of events that are related to a type of security issue.

Embodiments disclosed herein improve efficiency for identification of groups of events related to a particular type of security issue. The systems and methods disclosed herein provide a graphical interface that displays one or more summaries, each summary corresponding to group of events identified based on criteria used to identify a specific type of events based on security information. The summary may include information that summarizes the group of events associated with the summary. The information may include details including a count of the number of events in the group of security events. The information may include a metric representing a summary or calculation based on the count and/or one or more fields in each event of the group of security events. The summary may include one or more fields determined based fields in one or more security events of the group. In particular embodiments, the summary may be a selectable element that enables display of information of the underlying group of security events for the summary.

Disclosed embodiments provide one or more interactive elements (e.g., selectable controls) associated with a summary in the graphical interface to enable selective filtering of the summary. One such interactive element may be a remove element (e.g., a selectable control) for removing ("whitelisting") a summary from the graphical interface to indicate that the summary and/or related groups of events are acceptable (e.g., do not pose a security threat). Another interactive element associated with the summary may include a modify element for modifying ("blacklisting") a visual appearance of the summary (e.g., highlight or change a position) in the graphical interface to indicate that the summary and/or related groups of events pose a potential security threat.

A display may be provided to view summaries that have been whitelisted and/or blacklisted from the graphical interface. The display may include interactive elements to cause a whitelisted summary to be added back to the graphical interface. The display may include interactive elements to causes modification to a blacklisted summary to be undone. Thus, embodiments disclosed herein reduce effort involved to selectively filter events related to computing or network security. The graphical interface further enables events based on new received raw data to processed and the graphical interface to be updated for events that belong to a group of events in one or more summaries in the graphical interface.

In a particular embodiment, a computer-implemented method is provided. The computer-implemented method includes receiving, on a computing device, raw data and indexing the raw data. Indexing includes dividing the raw data into time stamped searchable events that include information relating to computer or network security. The computer-implemented method includes storing the indexed data in an indexed data store. The computer-implemented method includes extracting one or more values from a field in the indexed data using a schema. The computer-implemented method includes searching the one or more extracted field values for the security information. The computer-implemented method includes determining a group of security events. The group of security events is determined using the security information. Each security event of the group of security events includes a field value specified by a criteria. The computer-implemented method includes presenting a graphical interface including a summary of the group of security events, other summaries of security events, and a remove element. The remove element is associated with the summary. The computer-implemented method includes receiving input corresponding to an interaction of the remove element. Interacting with the remove element causes the summary to be removed from the graphical interface that displays the other summaries of security events. The computer-implemented method includes updating the graphical interface to remove the summary from the graphical interface that displays the other summaries of security events.

In another particular embodiment, a system is provided that includes one or more data processors and a non-transitory computer readable storage medium containing instructions which when executed on the one or more data processors, cause the processor to perform operations including receiving raw data and indexing the raw data. Indexing includes dividing the raw data into time stamped searchable events that include information relating to computer or network security. The operations include storing the indexed data in an indexed data store. The operations include extracting one or more values from a field in the indexed data using a schema. The operations include searching the one or more extracted field values for the security information. The operations include determining a group of security events. The group of security events is determined using the security information. Each security event of the group of security events includes a field value specified by a criteria. The operations include presenting a graphical interface including a summary of the group of security events, other summaries of security events, and a remove element. The remove element is associated with the summary. The operations include receiving input corresponding to an interaction of the remove element. Interacting with the remove element causes the summary to be removed from the graphical interface that displays the other summaries of security events. The operations include updating the graphical interface to remove the summary from the graphical interface that displays the other summaries of security events.

In yet another particular embodiment, a computer-program product is provided that is tangibly embodied in a non-transitory machine-readable storage medium that includes instructions configured to cause one or more data processors to receive, on a computing device, raw data and indexing the raw data. Indexing includes dividing the raw data into time stamped searchable events that include information relating to computer or network security. The instructions are further configured to cause the one or more data processors to store the indexed data in an indexed data store. The instructions are further configured to cause the one or more data processors to extract one or more values from a field in the indexed data using a schema. The instructions are further configured to cause the one or more data processors to search the one or more extracted field values for the security information. The instructions are further configured to cause the one or more data processors to determine a group of security events. The group of security events is determined using the security information. Each security event of the group of security events includes a field value specified by a criteria. The instructions are further configured to cause the one or more data processors to present a graphical interface including a summary of the group of security events, other summaries of security events, and a remove element. The remove element is associated with the summary. The instructions are further configured to cause the one or more data processors to receive input corresponding to an interaction of the remove element. Interacting with the remove element causes the summary to be removed from the graphical interface that displays the other summaries of security events. The instructions are further configured to cause the one or more data processors to update the graphical interface to remove the summary from the graphical interface that displays the other summaries of security events.

In yet another particular embodiment, a computer-implemented method includes receiving, on a computing device, machine data. The computer-implemented method further includes producing a summary of a group of security events. The security events are derived from machine data and are of a type used in a security information and event management field to analyze security issues. Producing the summary comprises discarding event information using a data reduction model. The computer-implemented method includes presenting a graphical interface including the summary of the group of security events, other summaries of security events, and a remove element. The remove element is associated with the summary. The computer-implemented method includes receiving input corresponding to an interaction of the remove element. Interacting with the remove element causes the summary to be removed from the graphical interface that displays the other summaries of security events. The computer-implemented method includes updating the graphical interface to remove the summary from the graphical interface that displays the other summaries of security events.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

The present disclosure is described in conjunction with the appended figures:

FIG. 7 shows a diagram illustrating an embodiment of a graphical interface presented by a security monitoring system;

FIG. 9 shows a diagram illustrating an embodiment of a graphical interface presented by a security monitoring system;

Like reference numbers and designations in the various drawings indicate like elements.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
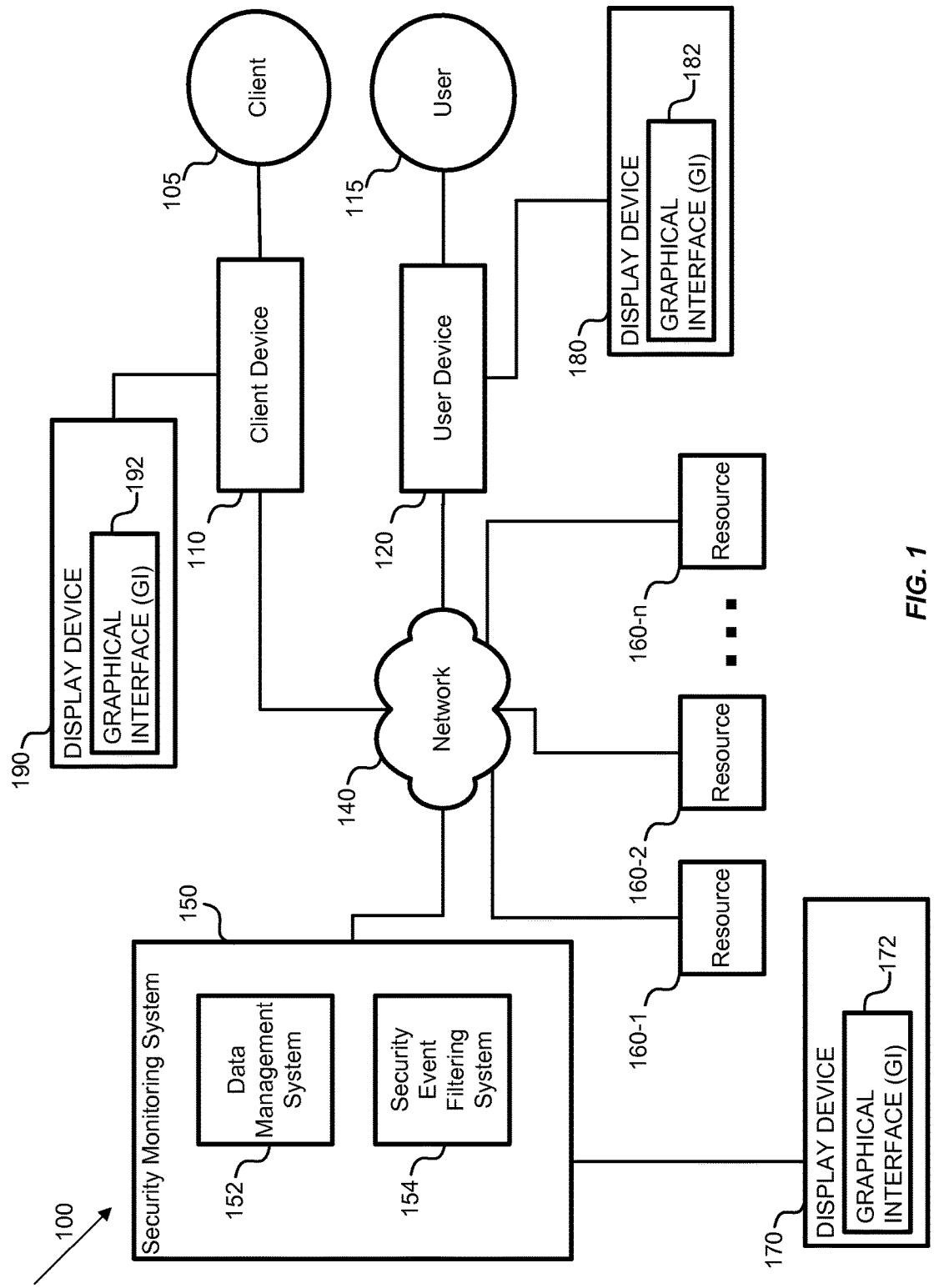
FIG. 1 is a block diagram illustrating components of an exemplary security event management environment in which various embodiments of the present invention may be implemented.

Referring first to FIG. 1, a block diagram illustrating an embodiment of a security event management environment 100 is shown. Those of skill will appreciate that other embodiments of the invention include systems having architecture varying from precisely that which is shown in FIG. 1. In a particular embodiment, the security event management environment 100 may be included in a security information and event management (SIEM) system. In other embodiments, the security event management environment 100 may include or implement a security event management (SEM) system.

The system 100 includes one or more devices, such as a client device 110 and a user device 120 operated by a client 105 and a user 115, respectively. The client 105 and/or the user 115 can interact with a security monitoring system 150 via a network 140 using respective devices 110 and/or 120. In at least one embodiment, the network 140, may include a local area network (LAN), a wide area network (WAN), a wireless network, and the like.

In addition to the components described here, the security monitoring system 150 may include or be implemented in a computing system. The computing system may include conventional components such as a processor, an operating system, and volatile and non-volatile memory. Although depicted as a single computing system, the security monitoring system 150 may also be implemented as a network of computer systems and/or processors. For example, the security monitoring system 150 may include one or more service devices, such as servers, mainframe computers, networked computers, any processor-based computing device, and similar types of systems and devices. In one embodiment, the security management system includes a random access memory (RAM) coupled to a processor. The processor executes computer-executable program instructions stored in memory. Such processors may include a microprocessor, an ASIC, state machines, or other processors, and can be any of a number or arrangement of suitable computing processors. Such processors include, or may be in communication with, code modules (or engines) and/or applications, which store instructions that, when executed by a processor, cause the processor to perform the operations described herein. For example, the security monitoring system 150 may include a data management system 152 and a security event filtering system 154, which are described in further detail below with respect to FIGS. 2-14. Some embodiments of the system have different and/or other modules than the ones described herein. Similarly, the steps described herein can be distributed among the modules in accordance with other embodiments in a different manner than is described here.

Client device 110 and/or user device 120 can each be a single electronic device, such as a hand-held electronic device (e.g., a smartphone). It will be understood that client device 110 and/or user device 120 can also include a system that includes multiple devices and/or components. The device(s) 110 and/or 120 can comprise a computer, such as the desktop computer, a laptop computer or a tablet. In some instances, a party 105 and/or 115 uses different devices at different times to interact with security monitoring system 150. In one embodiment, the devices 110 and/or 120 may be include any type of processor-based platform that operates on any suitable operating system that are capable of executing one or more code modules, engines, and/or applications, which store instructions that, when executed by a processor, cause the processor to perform the operations described herein.

The security monitoring system 150 provides the client 105 and/or the user 115 with tools to manage security events in a security event management system, such as the system 100. Specifically, the security monitoring system 150 can collect data including raw data (e.g., machine data, unstructured data, and/or weblogs) from one or more resources 160 (e.g., resource 160-1 through resource 160-n), process the data (e.g., internally and/or using one or more resources) to index the raw data into time stamped events that are searchable, extract values from fields in the indexed raw data, filter security-related events from the indexed raw data to identify groups of events based on criteria, and/or present a summary of groups of the filtered security events in a display view. A resource 160 from which data is collected can include one or more computing devices, e.g., a server, a router, network devices, and/or a user device 120. The events can pertain to an activity occurring in the system 100, such as a computer action, access control, endpoint activity, a communication (sent or received over a network), and/or network activity (e.g., network requests, connection attempts, traffic via a network device (e.g., a firewall, a router, a switch, or a network), requests for proxy or HTTP data, or creation of new domains).

Events related to computer and network security may be presented as groups of security events, where each group of security events have a field value that satisfies a criteria for the group of security events. A group of security events may be presented in or as part of a summary that presents information summarizing the security events in the group of security events. The summary may present one or more field values that satisfies the criteria used to determine the group. With a summary of a group of security events, one or more interactive elements may be presented that further enable selective filtering of the summary (and the group of security events). Selective filtering may enable the summary to be removed based on interaction with an interactive element by a user when the user determines the summary does not contain security events that are not relevant. Selectively filtering may also enable the summary to be modified by changing a visual appearance of the summary based on interaction with a control by a user when the user determines that the summary contains security events of interest (e.g., events that require further investigation).

The system includes one or more display devices, such as display device 170, display device 180, and display device 190. The display devices 170, 180, 190 enable presentation of information in the security management system for monitoring security events. The display devices 170, 180, 190 may present information via a graphical interface 172, a graphical interface 182, and a graphical interface 192, respectively. The graphical interfaces 172, 182, 192 may be generated by any component in the system, such as the security monitoring system 150, the client device 110, and the user device 120. The graphical interfaces 172, 182, 192 may be included in embodiments illustrated and described in further detail with respect to at least FIGS. 2-11. It may be appreciated that elements described or shown herein the graphical interfaces 172, 182, 192 are for purposes of example and that fewer elements, more elements, or different graphical interface elements may be used in implementations of embodiments of the invention without departing from the underlying concepts of the invention.

Note that a graphical interface depicted in the figures may represent a web-page that is presented to a user, with the graphical interface including one or more interactive elements (such as radio buttons, drop-down menus, interactive elements, selectable controls, data entry fields) that may be selected and/or activated by a user. The display of the graphical interface may result from any suitable method, including the execution of code or instructions, interpretation of markup language, etc. by a processing element (such as a browser or other application, computer, microprocessor, central processing unit, etc.). Further, the response to (or processing of) the selection or activation of a graphical interface element may be the result of the execution of code or instructions, interpretation of markup language, etc. by a processing element (such as a browser or other application, computer, microprocessor, central processing unit, etc.). Thus, in some embodiments a method, process, function, or operation may be implemented as a result of the execution of code or a set of instructions by a suitably programmed processor or computing device.

Note that each of the figures depicting the graphical interface and associated elements may be associated with a software-implemented process or method that is implemented by a suitably programmed processor or computing device in order to: (a) generate one or more of the depicted graphical interface elements; (b) permit a user to interact with one or more of the graphical interface elements (such as by activating an element or entering data into a data field); (c) process a user's selection or activation of a graphical interface element, or entry of data into a data field; or (d) perform one or more processes, operations or functions associated with the inventive service.

As detailed further below, the client 105 and/or the user 115 can interact with the security monitoring system 150 via a graphical interface 172, 182, 192 to dynamically filter events, such as network-type activities, that are identified as being potentially related to a security threat. Therefore, a client (e.g., the client 105) and/or a user (e.g., the user 115) has the ability provided by the security management system 100 to reduce time to investigate security events, such as those related to network activity, by using his/her own experience and knowledge to identify the most concerning events.

Figure 2:
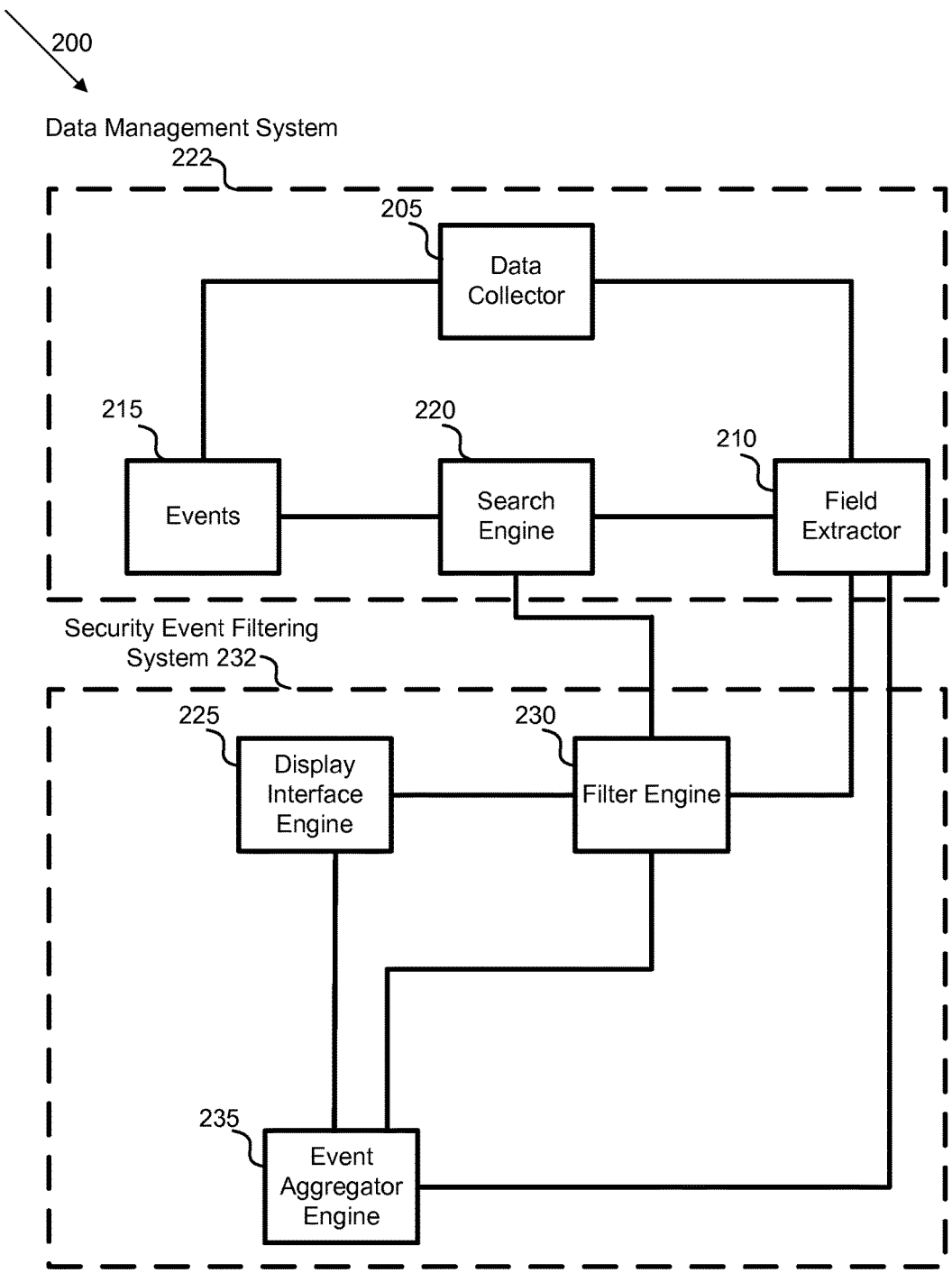
FIG. 2 shows a block diagram of an embodiment of a security monitoring system.

Now referring to FIG. 2, a block diagram of an embodiment of a security monitoring system 200 is shown. The security monitoring system 200 may be included or implemented in the security monitoring system 150 of FIG. 1. The security monitoring system 150 can be, in part or in its entirety, in a cloud. In some instances, at least part of security monitoring system 150 is present on a device, such as a client device 110. In some instances, various components in security monitoring system 150 are present in one or more resources. For example, the data management system 152 may be stored on or operated from the resource 160-1, and the security event filtering system 232 may be stored on and operated from the resource 160-2. Thus, security monitoring system 150 can include a distributed system.

A data collector 205 collects data, such as raw data, from one or more resources 160. can include unstructured data, structured data, and/or machine data. The data can include data from web logs and/or can pertain to web access. The data can pertain to network-based activities. Discrete events can be present within the data. These events can include HTTP requests and/or traffic logs. The events can pertain to an activity occurring in the system 200 such as a such as a computer action, access control activity, endpoint activity, a communication (sent or received over a network), and/or network activity (e.g., network requests, connection attempts, traffic via a network device (e.g., a firewall, a router, a switch, or a network), requests for proxy or HTTP data, or creation of new domains). As will be described in further detail herein, the collected data can be segmented into the events (e.g., time-based events) and particular values can then be extracted from the events.

Initially, and as further detailed below, a field extractor 210 extracts a timestamp from each event. Based on the timestamp, data collector 205 stores each event in an appropriate index in an event data store 215. The collected data corresponding to a time-based event may indicate a timestamp of an event. The collected data may include indicate a host device associated with the event and a source of the event. The host device associated with the event may correspond to a machine (or host device) from which the event originated. The source of the event may indicate source information, such as a source from where the collected data came. The source information may indicate a type of the source, which corresponds to a type of the collected data. The event data store 215 may include an indexed data store (e.g., a time-series data store) that stores each event based on indexed data corresponding to timestamps extracted from the events. The time stamped stored events may include information related to computer security or network security.

A search engine 220 can then locate events pertinent to a particular analysis at hand. A search engine 220 can access and search all or part of the event data store 215. Events corresponding to a particular time period may be retrieved based on events having a time-stamp within the particular time period. The search may include, e.g., a request to return all events or identifiers of all events having a value for a field meeting a criterion. A search may originate from a client via a graphical interface or may be received via a display interface engine 225. For example, filter engine 230 may request the search engine 220 to product time-based events for a particular time period. Events with time stamps within the particular time period can then be retrieved by search engine 220 from event data store 215. Data collector 205, field extractor 210, event data store 215 and search engine 220 can be part of a data management system 222, described in further detail in reference to FIG. 3 below. The data management system 222 may include or may be implemented as the data management system 152 of FIG. 1.

Additionally, in a request to the search engine 220, the filter engine 230 may specify values for one or more fields used to filter the time-based events to locate events having particular type of information (e.g., computer or network security). The events may be identified based fields having information related to computing activity such as access control information (e.g., login, logout, access allowed, access failure, or use of default accounts), endpoint information (e.g., malware infections, system configuration, system state, patch status, or time synchronization), and/or network traffic information (e.g., network requests, connection attempts, traffic via a network device, requests for proxy or HTTP data, HTTP requests, or creation of new domains). The search engine 220 may search indexed data of time stamped events for particular fields specified in a search request.

The filter engine 230 may provide an event aggregator engine 235 with time stamped events that have been identified as having information related to computer or network security based on criterion specified by the filter engine 230. Based on the events received from the filter engine 230, the event aggregator engine 235 may determine events a group of the events. In a particular embodiment, the event aggregator engine 235 may determine the group of events corresponding to a particular time period based on identifying events that have a time-stamp within the particular time period. The event aggregator engine 235 may further determine the group of events using the information that was used to locate the events filtered by the filter engine 230. In a particular embodiment, the event aggregator engine 235 may group the events based on events having one or more field values that relate to security information. In this embodiment, the field values of the events may be examined to determine whether they are included in or satisfy a criteria defining such a group.

In a particular embodiment, the event aggregator engine 235 may determine a group of security events based on the time stamped events provided by the filter engine 230. The time stamped events may be filtered by the filter engine 230 based on security information associated with criteria specified by the event aggregator engine 235. Following the event aggregator engine's 235 determination as to which values are to be examined for the time stamped events provided by the filter engine 230, the field extractor 210 may extract the appropriate values and return them to event aggregator engine 235. The event aggregator engine 235 may perform one or more correlation searches of the time stamped searchable events using the one or more extracted values. A correlation search may be performed of the extracted values based on the criteria. The group of security events may be determined based on results of the correlation search.

The criteria used to identify events of interest may be based on one or more fields of one or more time stamped events, such as a value or a range of values. Examples of criteria used to determine a group of security events are described and illustrated with respect to FIGS. 4, 5, and 7-9. To identify the events having field values that relate to security information, the event aggregator engine 235 may determine values to extract from the events using the security information. Events that have one or more fields specified by a criteria (e.g., a criteria for a potential security threat) may be added to the group of events. A group of events defined by a particular criteria may be useful for identifying patterns of events that occur in a similar manner or that are related in some way suggesting a potential security threat.

The display interface engine 225 is responsible for providing an interface that presents information determined by the security event filtering system 232 to a client or a user. The display interface engine 225 may present a graphical interface (e.g., the graphical interface 172, the graphical interface 182, or the graphical interface 192) to a display device (e.g., the display device 170, the display device 180, or the display device 190) coupled to the security monitoring system 200. In a particular embodiment the display interface engine 235 may determine a summary of one or more groups of security-related events determined by the event aggregator engine 235. One or more of these summaries presented in the graphical interface may be presented by the display interface engine 225.

A summary may include information that summarizes one or more fields included in one or more security events of the group of security events. Such summary information may include information such as a count of the number of events in the group of security events and/or a metric summarizing a particular field in each event of the group of security events. The summary may include one or more fields determined based on a field in one or more security events of the group. The summary may be based on results of one or more correlation searches performed by the even aggregator engine 235. In a particular embodiment, the summary of a group of security events and/or the underlying group of security events associated with the summary may be stored in a database for retrieval at a later time. Storage of the summary may include storing data associated with one or more of the security events in the group of security events corresponding to the summary.

In particular embodiments, the summary may be an interactive element or may include one or more interactive elements (e.g., selectable controls). Interaction with the summary or one or more interactive elements may cause information related to one or more security events of the group of security events to be displayed in the graphical interface. When information related to the security events is displayed in the graphical interface, interaction with the summary may cause the security events to be hidden from display in or removed from the graphical interface. The information related to the one or more security events may be displayed with the summary in the graphical interface. Additional details and examples of a summary of security events shall be described in further detail with respect to FIGS. 4-6 and FIGS. 7-9. Providing a summary of security events affords a user an ability to improve understanding of relationships between security events. A summary enables the user to decrease effort involved for identification and isolation of events by blacklisting and/or whitelisting groups of security-related events.

In particular embodiments, the interface may provide additional information about a summary of a group of security events and/or each of the security events in the summary. The additional information may include charts, visual displays, graphs, statistics, metrics, or other displays of related information, or a combination thereof, associated with the summary and/or based on information from data associated with the group of security events of the summary.

In particular embodiments, the security event filtering system 232 may routinely, periodically, automatically, or dynamically modify the graphical interface for events identified by the data management system 222 based on new raw data collected by the data collector 205. For example, the display interface engine 225 may update the graphical interface to update a summary of a group of security events based on new security events. The new security events may be identified by the event aggregator engine 235 as belonging to the group of security events after the graphical interface had been generated. Further, the additional information displayed in the graphical interface may be updated or modified accordingly based on a modification to a summary of a group of events displayed in the graphical interface.

To reduce time needed by a user to sorting through security events for potential security events of interest, the graphical interface may include one or more features to enable selective filtering of at least one summary of a group of security events displayed in the graphical interface. In a particular embodiment, the graphical interface may include one or more interactive elements that enable selective filtering of a summary of a group of security events. For example, the graphical interface may include an interactive element (e.g., a remove element) that, when interacted with, causes a summary of a group of security events associated with the interactive element to be removed ("whitelisted") from the graphical interface. This feature enables the user to remove security events that may are acceptable (e.g., not relevant for identification of a particular security threat).

In another example, the graphical interface may include an interactive element (e.g., a modify element) that, when interacted with, causes a summary of a group of security events associated with the interactive element to be modified in the graphical interface. In other words, the summary may be "blacklisted" by being modified to identify a significance of the security events in the group shown for the summary. In a particular embodiment, modification of the summary may include changing a visual appearance of the summary in the graphical interface. Changing the visual appearance of the summary may include highlighting the summary, changing a color of the summary, or any other change that affects how the summary appears in the graphical interface. For example, the summary may be displayed in a different position or location in the graphical interface.

In a particular embodiment, the display interface engine 225 may generate one or more views or displays (e.g., a filter panel) that include information associated with at least one summary of a group of security events that was selectively filtered (e.g., blacklisted or whitelisted) from the graphical interface. In particular embodiments, a display may include information associated with at least one blacklisted summary and/or at least one whitelisted summary. The display may include one or more interactive elements associated with each of the summaries displayed in the display. Interaction with one of the interactive elements associated with a summary in the view may enable a user to undo an action that caused the summary to be included in the display. For example, selection of an interactive element associated with a summary that is whitelisted may cause the summary to be added back to the graphical interface that displaying summaries before selective filtering was applied. In another example, selection of an interactive element associated with a summary that is blacklisted may cause modification of the summary on the graphical interface to be undone.

In a particular embodiment, the graphical interface may provide one or more interactive elements that, to selectively suppress a summary for a period of time. The display interface engine 225 may generate a display or a view (e.g., a suppression panel), or alternatively modify the graphical interface to enables a user to specify a current or future time, or time period when the summary is to be suppressed, or removed from the display. The display interface engine 225 may remove the summary from the graphical interface for time period specified via the suppression panel.

While "event" has been described as a time stamped, searchable segment of raw data (e.g., unstructured data, machine data, and/or weblogs) in a data store (e.g., a time series data store), an "event" in alternative embodiments may include any kind of security-related information typically referred to as an "event" in a SIEM field, and such events may be derived from raw data. Such "events" need not be limited to time stamped, searchable segments of raw data. Vendors in a SIEM field may implement a process to segment data based on a "data reduction model" whereby events are discarded except events recognized as notable. In alternative embodiments, one or more summaries displayed in a graphical interface as described herein may include one or more summaries of SIEM events that are obtained from data based on application of a data reduction model. A summary of SIEM events may be selectively filtered (e.g., blacklisted and/or whitelisted) with respect to a summary in a graphical interface. The summary of SIEM events may include features such as one or more interactive elements associated with the summary.

Thus, security monitoring system 150, 200 can reduce an amount of events presented for analysis to a user by providing a system that organizes and correlates related events. The system further provides tools to for identification and analysis of security events that may be related to a potential threat by a particular mechanism or source. These features can be particularly advantageous in the security field, where security threats evolve in technique and style.

The embodiments described with respect to FIG. 2 and other embodiments and examples of functions and features of the security event filtering system 232 are described in further detail and illustrated with respect with FIGS. 4-11.

Figure 3:
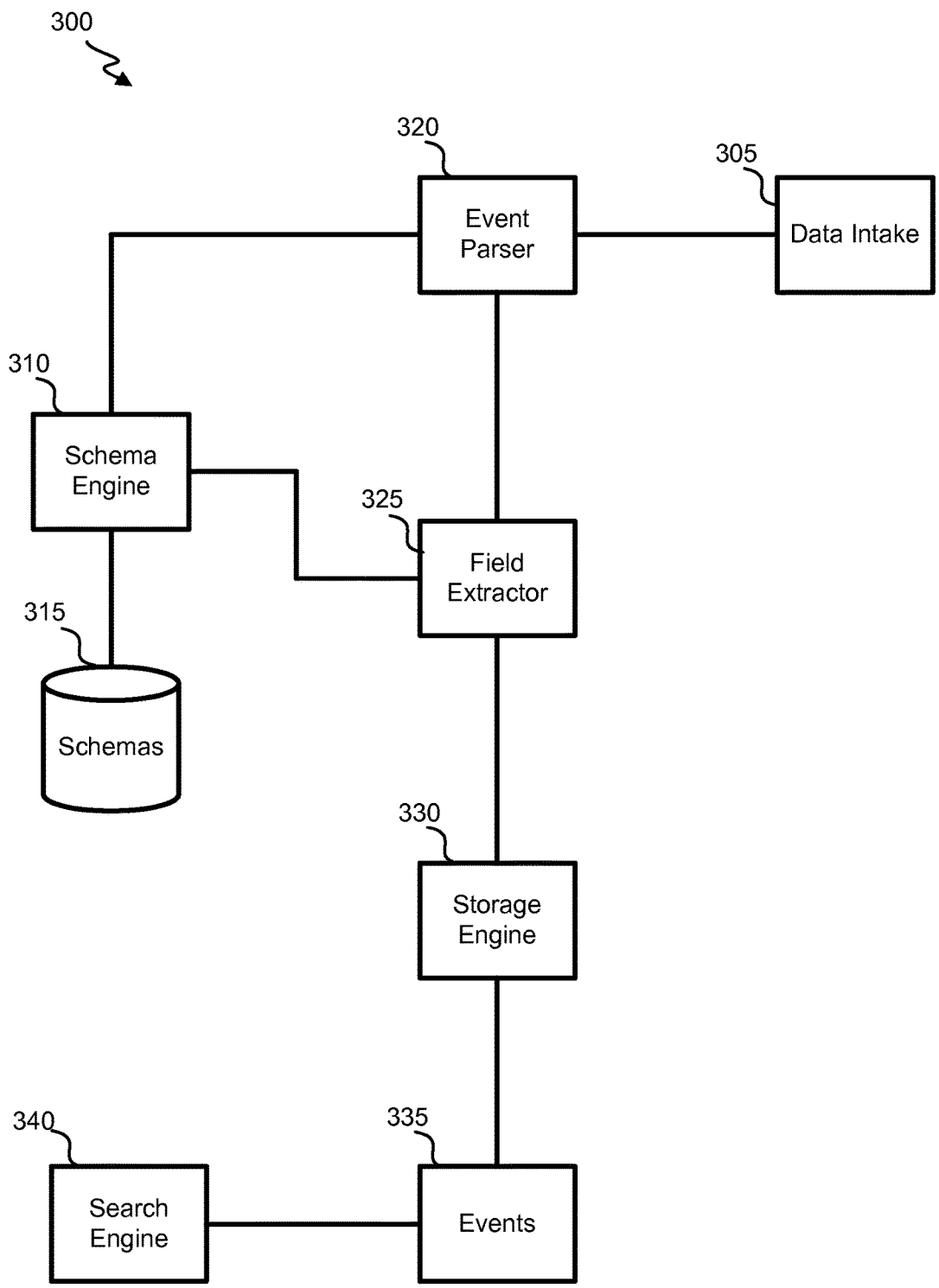
FIG. 3 shows a block diagram of an embodiment of a data management system.

FIG. 3 shows a block diagram of an embodiment of a data management system 222. The data management system 222 may include or be implemented within the data management system 152 of FIG. 1. The data intake 305 receives data, e.g., from a data provider, client, or user. The data can include automatically collected data, data uploaded by users, or data provided by the data provider directly. In some instances, the data includes a structure that allows for individual events and field values within the events to be easily identified. The structure can be predefined and/or identified within the data. For example, various strings or characters can separate and/or identify fields. As another example, field values can be arranged within a multi-dimensional structure, such as a table. In some instances, data partly or completely lacks an explicit structure. For example, in some instances, no structure for the data is present when the data is received and instead is generated later. The data may include a continuous data stream can include multiple events, each with multiple field values.

A schema engine 310 identifies an applicable schema that can be used to extract specific field values by imposing structure on data. Specifically, a schema can be "bound" to data, by breaking a data stream (e.g., a byte stream) into events and/or extracting field values, such as a time stamp. Schema binding can occur while receiving data, prior to storing data, while storing data, while processing data, while retrieving data, while responding to a search query or some combination of the above (e.g., separating data into events at intake and extracting field values from events while responding to a search query). Late binding schema can be used, which imposes structure on the data at query time rather than at storage or ingestion time. Thus, the schema may be applied at query time as opposed to an earlier stage when the data is being born (e.g., when the data is received).

Schema engine 310 can itself estimate a schema or can determine a schema based on input from a client or data provider. The input can include the entire schema or restrictions or identifications that can be used to estimate or determine a full schema. Such input can be received to identify a schema for use either with structured or unstructured data and can be used to reliably extract field values. The schema can be estimated based on patterns in the data (e.g., patterns of characters or breaks in the data) or headers or tags identifying various fields in the data, such as <event><message time>2014.01.05.06.59.59</> . . . </>). Schema can be received or estimated in a variety times, including (in some instances) any time between receipt or indexing of the data and a query time. The time that the schema is actually received or estimated within the receipt-to-indexing time period may be determined based on a setting or system load. Schema engine 310 can perform the schema estimation once or multiple times (e.g., continuously or at routine intervals). Once a schema is determined, it can be modified (e.g., periodically, at regular times or intervals) upon receiving modification-requesting input, upon detecting a new or changed pattern in the input, or upon detecting suspicious extracted field values (e.g., being of an inconsistent data type, such as strings instead of previously extracted integers). In some instances, a client or data provider can provide input indicating a satisfaction with or correction to estimated schema. Received or estimated schemas are stored in a schema data store 315

Using the schema, an event parser 320 can separate the received data into events. For example, event parser 320 can separate data between particular start and stop tags, or separate data within a table's row, or separate data within particular character numbers in the data. Also using the schema, a field extractor 325 can extract various field values. In some instances, field extractor 325 further attaches a semantic meaning to the extracted field values (e.g., based on a length and/or character types of the field values). Field extractor 325 can further convert field values into a particular (e.g., standard or easily searchable) format.

It is noted that data collector 205 from system 200 can largely parallel the combination of data intake 305 and event parser 320. While system 200 does not explicitly show schema engine 310 and schema data store 315, it will be appreciated that system 200 can include these elements, which can then be utilized by data collector 205 and field extractor 210.

A storage engine 330 can store data in an event data store 335, which can correspond to event data store 215. It will be appreciated that event data store 335 can include multiple data stores or sub-data stores. Event data store 335 can be stored in working, short-term and/or long-term memory. In various instances, event data store 335 can include raw data, extracted events or extracted field values. It will be appreciated that, in some instances, part of the data received by data intake 305 can be deleted or not stored (e.g., field breaks).

Events and/or field values can be stored at locations based on a field value. For example, a field value identifying a message sender may be stored in one of ten data stores, the data store being chosen based on a message time. In some instances, rather than grouping various data components at specific storage areas, event data store 335 includes an index that tracks identifiers of events and/or fields and identifiers of field values. Thus, for example, the index can include an element for "Data type=webpage request" (indicating that the element refers to a field value of "webpage request" for the field "data type") and then list identifiers for events with the field value (e.g., "Events 3, 7, 9 and 16"). Selective storage grouping can be referred to as storing data in "buckets". Bucket definitions can be fixed or defined based on input from a data provider, client or client. Input and/or automatic rules can be used to add, merge or delete buckets.

In some instances, a time-series data store is used, such that events and/or field values are stored at locations based on a timestamp extracted from the events. This can allow events with recent timestamps (e.g., which may have a higher likelihood of being accessed) to be stored at preferable memory locations that lend to quicker subsequent retrieval. Further, parallel processing can then be performed, with each process operating on a different time bucket.

A search engine 340 (which can correspond to search engine 220) can subsequently access and search all or part of event data store. The search can be performed upon receiving a search query from a client, user or client, or the search can be performed periodically and/or at defined intervals or times. Segregation of data into events and/or fields can allow for more efficient searching. The search may include, e.g., a request to return all events or identifiers of all events having a value for a field meeting a criterion. To illustrate, search engine 340 can retrieve all events having a timestamp within a defined time period, and/or all events having a first field value (e.g., HTTP method) set to a specified value (e.g., GET).

The search may include, e.g., a request to return values for one or more first fields for all events having specified values (e.g., specific values or values within a specific range) for one or more second fields. To illustrate, search engine 340 can retrieve all URLs in events having a timestamp within a defined time period, or all events having a first field value (e.g., HTTP method) set to a specified value (e.g., GET).

In some instances, upon retrieving the event data of interest, search engine 340 may further process the results. The processing may be performed based on an individual value (e.g., to obtain a length or determine if an extracted field value matches a specified value). In some instances, processing can be performed across values, e.g., to determine an average, frequency, count or other statistic. Search engine 340 can return the search result to data provider, client or user, e.g., via an interface (such as a web interface or app interface) or email.

Figure 4:
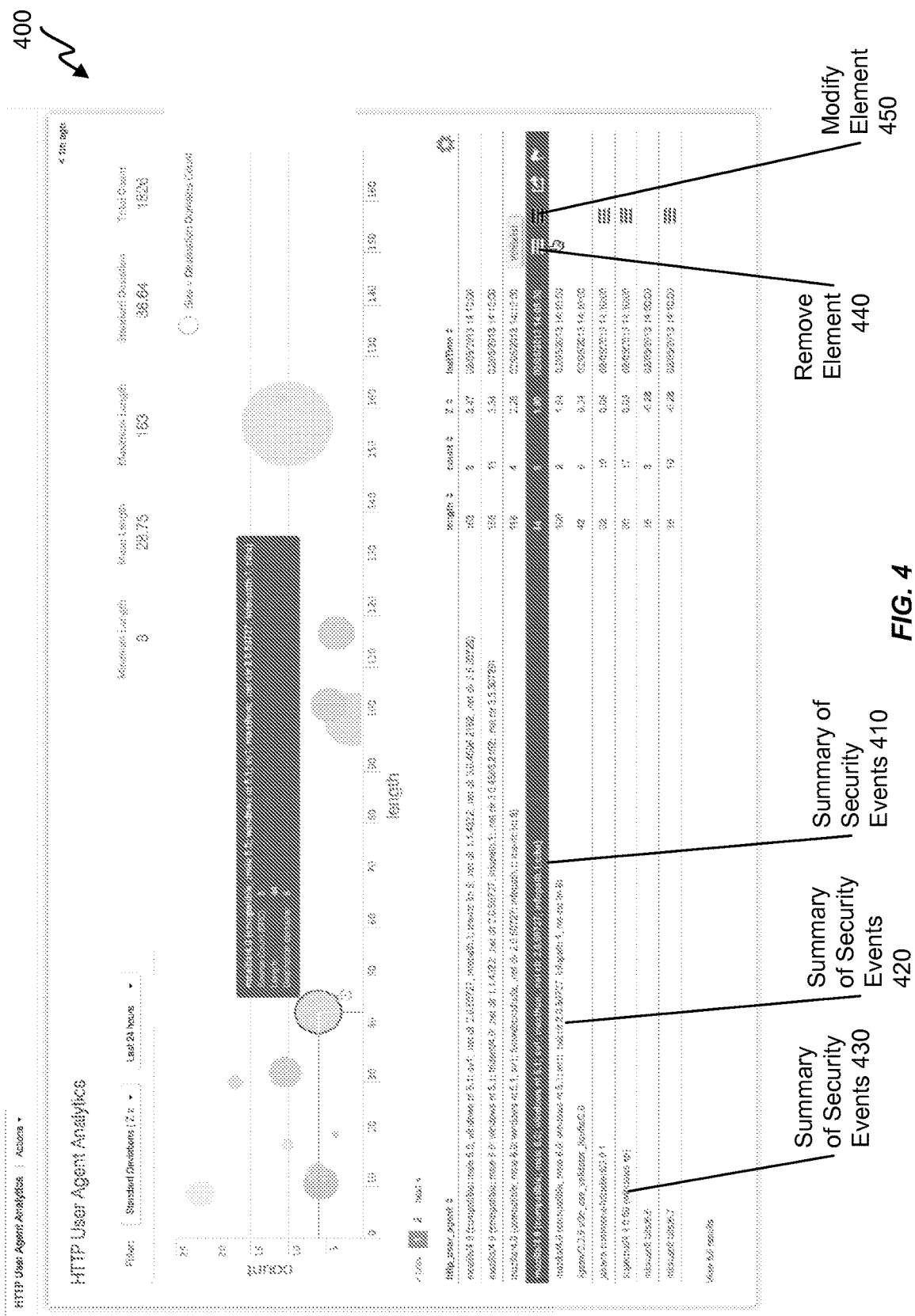
FIG. 4 shows a diagram illustrating an embodiment of a graphical interface presented by a security monitoring system.

Now turning to FIG. 4, a diagram illustrating an embodiment of a graphical interface 400 presented by a security monitoring system is shown. The graphical interface 400 may be presented by the security monitoring system 150 of FIG. 1 or the security monitoring system 200 of FIG. 2. The graphical interface 400 is an example of a graphical interface that may be generated by the display interface engine 225 of FIG. 2. As shown, the graphical interface 400 presents information about events related to activity associated with computing and network security. In FIG. 4, the time-based events may be based on raw data including hypertext transfer protocol (HTTP) or proxy data. Specifically, the graphical interface 400 presents information about HTTP user agents identified in time stamped events obtained from raw data.

In a particular embodiment, the graphical interface 400 may include information about one or more groups of security events. The graphical interface 400 illustrates representative summaries including a summary of a group of security events 410, a summary of a group of security events 420, and a summary of a group of security events 430. While the representative summaries 410, 420, 430 are discussed, the graphical interface 400 may also display other summaries of other groups of events determined by the security event filtering system 232. Each of the summaries 410, 420, 430 may each include a group of security events determined by the security filtering system 232. In the embodiment illustrated in FIG. 4, each of the group of security events associated with summaries 410, 420, 430, respectively, has one or more fields, such as a user agent string (e.g., "http_user_agent" field), specifying by criteria to identify groups of events related to activity associated with particular HTTP user agent strings. To further illustrate, security events associated with the summary 410 may be group because the security events in the group have an HTTP user agent string with a particular length (e.g., a length value of 44) that satisfy criteria indicating a particular length or range of lengths for a HTTP user agent string. The criteria for a length based on a HTTP user agent string may be based on a length of particular misspelled or malicious user agent strings. As such, security events satisfying the criteria may be grouped and summarized in the summary 410. The summary may enable a user to reduce effort to identify events related to network activity with satisfying the criteria.

One or more of the summaries 410, 420, 430 may include information summarizing a group of security events in the respective summaries 410, 420, 430. For example, the summary 410 may include a value of the field, such as the "http_user_agent" identifying a HTTP user agent field in each of the group of security events that satisfy criteria for the group. The summary 410 may include other information based on common fields or information that describes the group of security events. For example, the summary 410 may include a length of the http_user_agent string that is common or that defines the events in the group of security events in the summary 410. The summary 410 may include a count of a number of security events in the group of security events included in the summary 410. The summary 410 may include a time corresponding to when the network activity associated with the security events occurred.

Although not shown, the summaries 410, 420, 430 may include or implement an interactive element. Interaction with the interactive element may cause information related to the one or more security events of the group of security events of the respective summary 410, 420, 430 to be presented in the graphical interface 400 with the respective summary 410, 420, 430. Interaction with a summary 410, 420, 430 may cause security events displayed in the graphical interface 400 with the summary 420, 420, 430 to be hidden from display or removed from the graphical interface 400 when one or more security events are displayed with the respective summary 410, 420, 430.

In a particular embodiment, one or more of the summaries 410, 420, 430 may include one or more interactive elements to control selective filtering as enabled by security event filtering system 232 of FIG. 2. For example, a summary in the graphical interface 400 may include a remove element ("whitelist" control), a modify element ("blacklist" control), or both. The remove element may enable a user to remove ("whitelist") the summary from the graphical interface 400. A user may desire to remove the summary based on a determination that the information provided by the summary is acceptable, not warranting further analysis. The modify element may enable a user to modify ("blacklist") the summary in the graphical interface 400 to cause the graphical interface 400 to change a visual appearance of the summary. A user may desire to modify the summary based on a determination that the security events associated with the summary require further investigation as a possible security threat.

The summary 410 illustrates an example with a remove element 440 and a modify element 450. Although not shown, a selection of the remove element 440 may cause the summary 410 to be removed from the graphical interface 400. A selection of the modify element 450 may cause the summary 410 to be modified in graphical interface 400. In some embodiments, the summary 410 may be modified to be displayed in a different position/location in the graphical interface 400, such as at a top of a list of the summaries. In other embodiments, the summary 410 may be highlighted, or a visual appearance (e.g. a color) of the summary 410 may be changed. Although an example is described for one summary of the graphical interface 400, any number of summaries may include interactive elements, such as the remove element 440 or the modify element 450.

In particular embodiments, the graphical interface 400 presents additional information based on the security events corresponding to the summaries including the summaries 410, 420, 430. For example, the additional information may include a minimum length corresponding to a shortest user agent string found in the data, a mean length representing an average length of a user agent string in the data, a maximum length: representing a longest user agent string found in the data, a standard deviation of user agent strings found in the data, and a total count of user agent strings in the data. The graphical interface 400 may present a chart illustrating information associated with each of the summaries. Such additional information may be useful for determining whether the summaries 410, 420, 430 identify a security threat that requires further analysis. The statistics may assist in the identification of a trend between summaries based on similar lengths of user agent strings. The identification may be useful for identifying security threats posed from a single source applying different mechanisms, such as different user agent strings.

Figure 5:
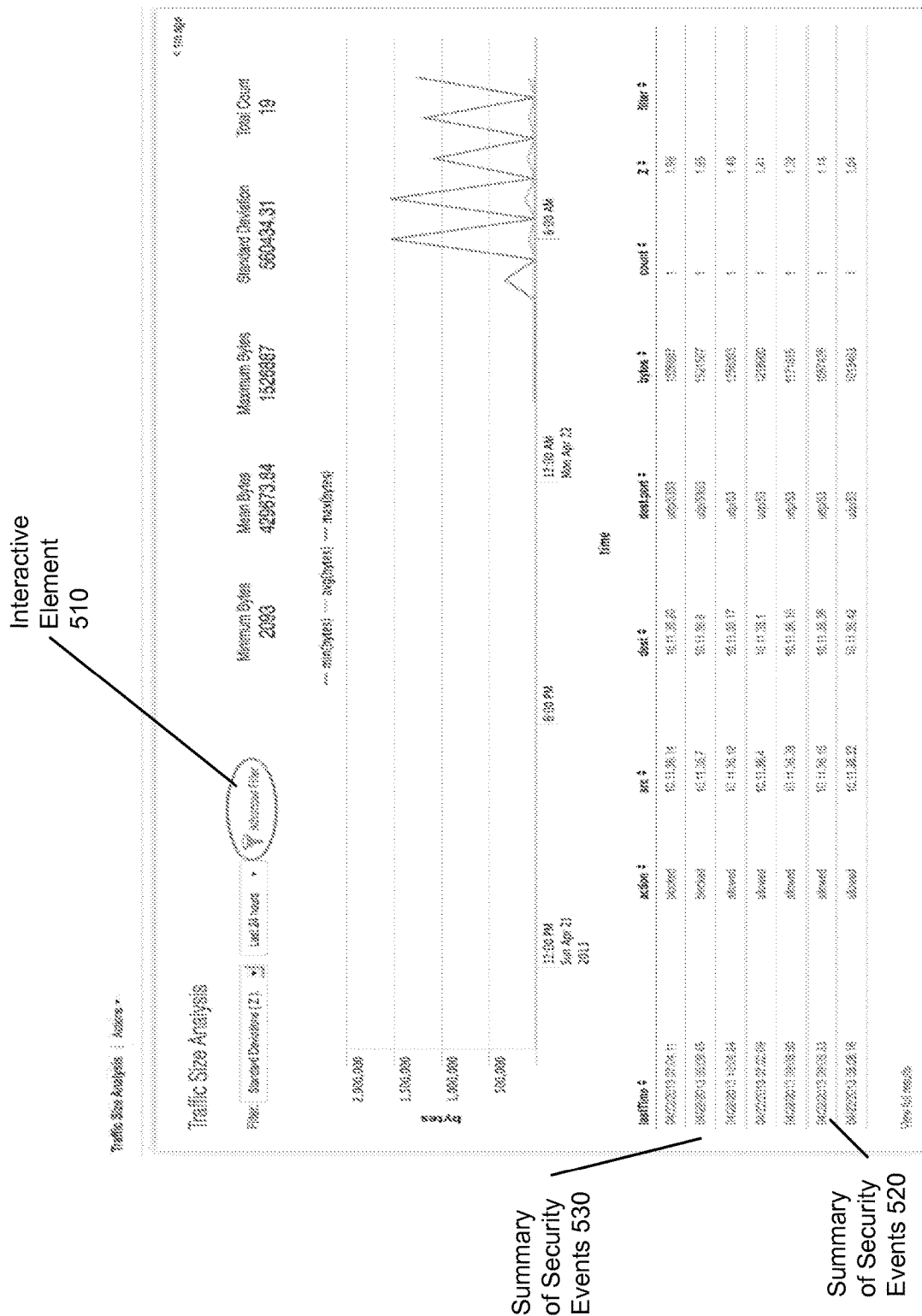
FIG. 5 shows a diagram illustrating an embodiment of a graphical interface presented by a security monitoring system.

Now turning to FIG. 5, a diagram illustrating an embodiment of a graphical interface 500 presented by a security monitoring system is shown. The graphical interface 500 may be presented by the security monitoring system 150 of FIG. 1 or the security monitoring system 200 of FIG. 2. The graphical interface 500 is an example of a graphical interface that may be generated by the display interface engine 225 of FIG. 2. As shown, the graphical interface 500 presents information about events associated with network activity. In FIG. 5, the time-based events may be based on raw data including HTTP and proxy data. Specifically, the graphical interface 500 presents information about network traffic data identified in time stamped events from the HTTP and proxy data.

The graphical interface 500 may include information about one or more groups of security events, each event identified based on having a field specified in a criteria of network security. The graphical interface 500 illustrates representative summaries including a summary of a group of security events 520 and a summary of a group of security events 530. While the representative summaries are discussed, the graphical interface 500 may display other summaries of events. In the example illustrated in FIG. 5, each of the summaries 520 and 530 represent a single security event determined by the security event filtering system 232.

Each security event associated with one of the summary 520, 530, respectively, has one or more fields that satisfy criteria for activity associated with network traffic security. For example, the events associated with each of the summary 510, 520 includes a source field (e.g., "src" field) and a time field (e.g., "lastTime" field) which are used to satisfy criteria identifying network traffic from a particular source during a particular time period. The criteria may be defined to identify network traffic events where data was exchanged during a particular time range, such as 12:00 am to 12:00 pm, from a particular source. Such criteria may enable identification of an increase in network traffic activity during the particular time period suggestive of a potential issue relating to network security. The security events the specify the criteria may be grouped into individual summaries 520, 530 because the security events are distinct events distinguishable by the source field.

Each of the summaries 520, 530 may include information summarizing the security event for the respective summaries 520, 530. For example, the summary 520 may include a value of the source field ("src") identifying a source of the security event associated with the summary 520, the destination field ("dest") identifying a destination of the security event associated with the summary 520, a time field ("lastTime") identifying a time the event occurred, and a byte field ("byte") identifying the number of bytes indicated in the security event associated with the summary 520. The summary 520 may include a count of a number of security events in the group of security events of the summary 520. Although not shown, the summaries 520, 530 may include or implement an interactive element. Interaction with the interactive element of a summary (e.g., the summary 520 or the summary 530) may cause the group of security events associated with the summary to be included in the graphical interface 500.

In a particular embodiment, the graphical interface may include one or more interactive elements to control selective filtering (blacklisting and whitelisting) as enabled by the security filtering system 232. For example, the graphical interface 500 may include an interactive element 510. Interaction with the interactive element 510 may cause the data interface engine 235 to present a display (e.g., a "filter panel"), such as a display shown in FIG. 6 described herein, that enables a user to remove (whitelist) the summaries 520, 530 in the graphical interface 500. The display may include information describing information provided in the summaries 520, 530 and one or more interactive elements to enable selection of one or more of the summaries 520, 530 for filtering. Details of features and functions of the display presented in response to selection of the interactive element 510 may be described in further detail with respect to FIG. 6. Although not shown, the graphical interface 500 may include one or more interactive elements, such as a modify element and a remove element for selective filtering as described with respect to FIG. 4.

In particular embodiments, the graphical interface 500 presents additional information based on the security events corresponding to the summaries including the summaries 520, 530. For example, the additional information may include a minimum bytes representing a shortest byte length found in the data, mean bytes representing an average byte length of a traffic event in the data, maximum bytes representing a longest byte length found in the data, standard deviation (or variance from the average) of URL strings found in the, and a total count indicating a total number of traffic events in the data. The graphical interface may present a chart displaying the minimum, average, and maximum bytes of traffic as a line graph over time. These statistics may assist in the identification of a trend of security events associated with network traffic. For example, such information may be used to investigate traffic data byte lengths to identify connections with a large byte count per request, or a source making a high number of connection attempts, but with small byte count sizes. Such information promotes identification of malicious network activity (e.g., a security threat) that may be determined based on a number of requests from a particular source to a particular destination and an amount of data requested. Using the interactive element, summaries may be whitelisted to focus investigation towards summaries that require further analysis.

Figure 6:
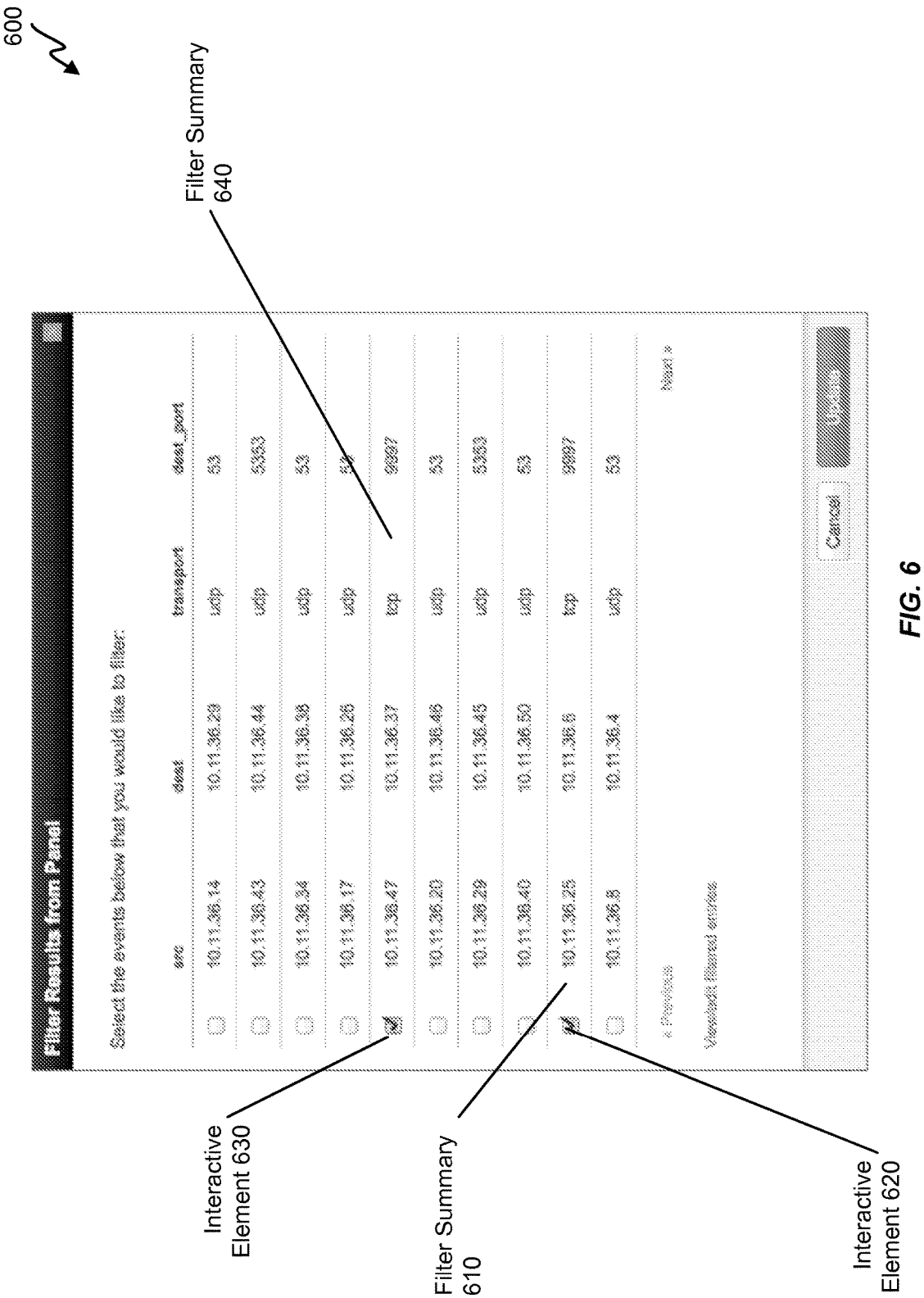
FIG. 6 shows a diagram illustrating an embodiment of a display presented by a security monitoring system.

In FIG. 6, a diagram illustrating an embodiment of a display 600 presented by a security monitoring system is shown. The display 600 (e.g., "filter panel") may be presented by the security monitoring system 150 of FIG. 1 or the security monitoring system 200 of FIG. 2. Specifically, the display 600 may be generated and presented by the display interface engine 225 of FIG. 2.

The display 600 may be presented in response to an interaction with an interactive element (e.g., the interactive element 510 of FIG. 5, the interactive element 710 of FIG. 7, the interactive element 810 of FIG. 8, the interactive element 910 of FIG. 9) included in a graphical interface, such as one of the graphical interfaces 500, 700, 800, 900. For illustration, the display 600 is explained with respect to FIG. 5. The display 600 may include representative filter summary information 610 and filter summary information 640 identifying a corresponding summary from the graphical interface 500. The filter summary information 610, 640 may include all or a portion of a respective summary 520, 530 from the graphical interface 500. In a particular embodiment, each of the filter summary information 610, 640 may be associated with a representative interactive element 620 and a representative interactive element 630, respectively. The interactive element 620,630 may control whitelisting or blacklisting of a respective summary in the graphical interface 500. In a particular embodiment, when the interactive element 620, 630 is selected, a corresponding summary in the graphical interface 500 may be removed (whitelisted), and when the interactive element 620, 630 is not selected, the corresponding summary may be added to the graphical interface 500. In another particular embodiment, when the interactive element 620, 630 is selected, a corresponding summary in the graphical interface 500 may be modified (blacklisted), and when the interactive element 620, 630 is not selected, modification of the corresponding summary may be undone. The modification may include changing a visual appearance of the corresponding summary. In some embodiments, the display 600 may include an interactive element to cause the graphical interface 500 to be updated based on interaction with one or more of the interactive elements 610, 640.

Figure 7:
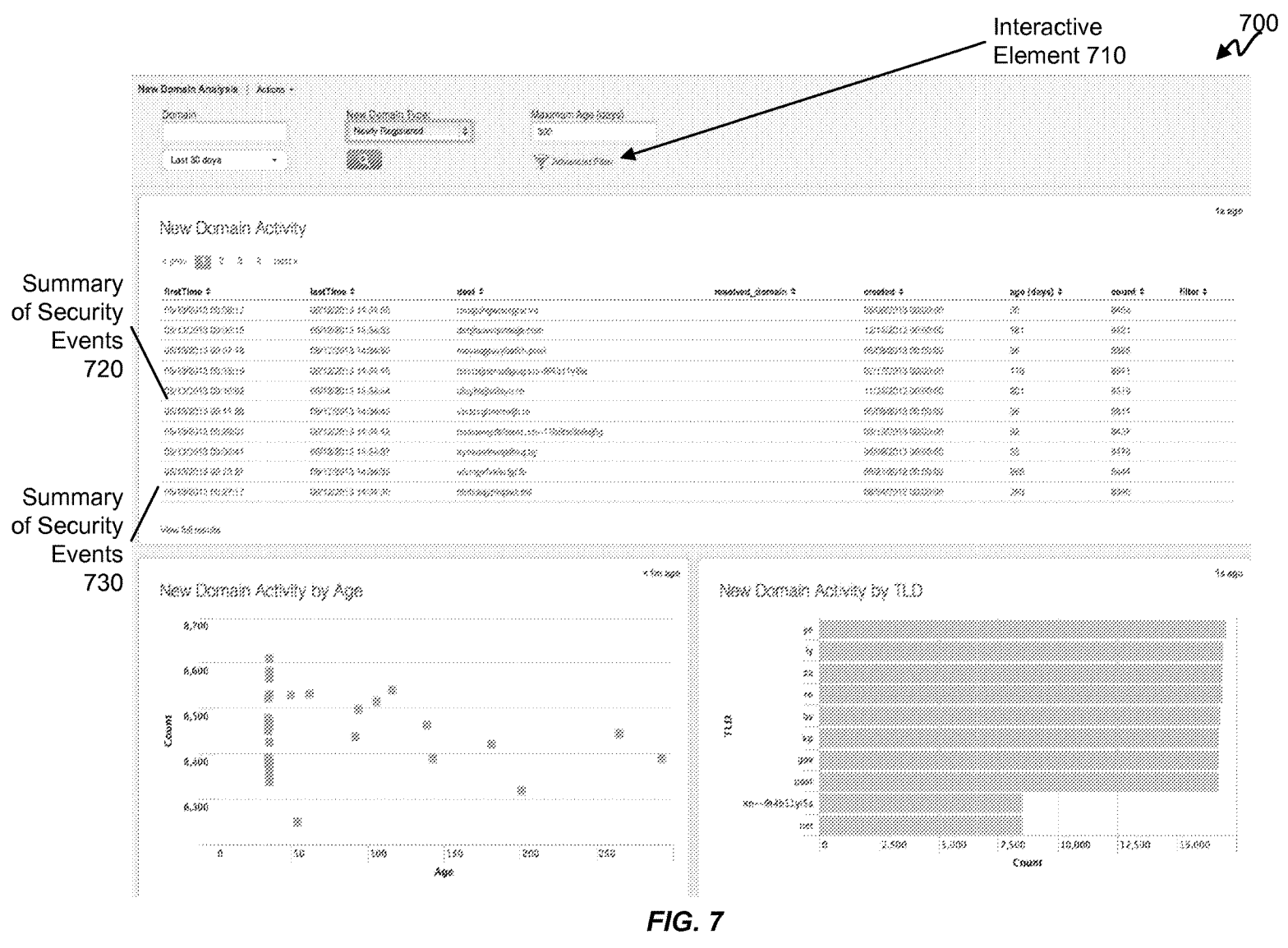

Now turning to FIG. 7, a diagram illustrating an embodiment of a graphical interface 700 presented by a security monitoring system is shown. The graphical interface 700 may be presented by the security monitoring system 150 of FIG. 1 or the security monitoring system 200 of FIG. 2. The graphical interface 700 is an example of a graphical interface that may be generated by the display interface engine 225 of FIG. 2. As shown, the graphical interface 700 presents information about events associated with domain activity. Specifically, the graphical interface 700 presents information about domain activity identified in time stamped events.

The graphical interface 700 may include information about one or more groups of security events, each event identified based on having a field specified in a criteria for domain activity indicative of network security. The graphical interface 700 illustrates representative summaries including a summary of a group of security events 720 and a summary of a group of security events 730. While the representative summaries 720, 730 are illustrated, the graphical interface 700 may display other summaries of events. In the example illustrated in FIG. 7, each of the summaries 720 and 730 may be associated with a single security event determined by the event aggregator engine 235 for the respective summaries 720, 730. The security event associated with the summary 720, 730, respectively, has one or more fields, such as a time field (e.g., "lastTime" field), a destination field (e.g., "dest" field), and a count field ("count") that satisfy criteria for activity associated with network traffic data. The security event filtering system 232 may determine the security events identified for each of the summaries 720, 730. The may be identified based on satisfaction of criteria for identifying network traffic events including a particular range of values of a count of requests made for a particular destination during a particular time period (e.g., 12:00 pm to 12:00 am). Such criteria may enable identification of an increase in domain requests for a particular destination during the particular time period suggestive of a potential issue relating to network security. The security events that specify the criteria may be grouped into individual summaries 720, 730 based on having distinct values for the destination field.

Each of the summaries 720, 730 may include information summarizing the security event for the respective summaries 720, 730. For example, the summary 720 may include a value of the "dest" field identifying a destination of the security event associated with the summary 720, a "lastTime" field identifying a time the event occurred, and the "byte" field identifying a count for requests for a particular domain associated for the security event of the summary 720.

In a particular embodiment, the graphical interface may include one or more interactive elements to control selective filtering as enabled by the security filtering system 232. The selective filtering may enable whitelisting or blacklisting of events. For example, the graphical interface 700 may include an interactive element 710. Selection of the interactive element 710 may cause the security filtering system 232 to present a display (e.g., a "filter panel"), such as a display shown in FIG. 6 described herein, that enables a user to remove (whitelist) or modify (blacklist) the summaries 720, 730 in the graphical interface 700. The display may include information describing the summaries 720, 730 and one or more interactive elements to enable selection of one or more of the summaries 720, 730 for filtering. Details of features and functions of the display presented in response to selection of the interactive element 710 may be described in further detail with respect to FIG. 6. Although not shown, the graphical interface may include one or more interactive elements, such as a modify element and a remove element for selective filtering as described with respect to FIG. 4.

In particular embodiments, the graphical interface 700 presents additional information based on the security events corresponding to the summaries including the summaries 720, 730. The graphical interface may present a chart displaying new domain activity based on a particular field (e.g., time or top level domain name) associated with domain activity. These statistics may assist in the identification of a trend of security events associated with domain activity. Further, the summary of security events included in the graphical interface 700 may be useful for identification of a count of requests for a particular domain.

Figure 8:
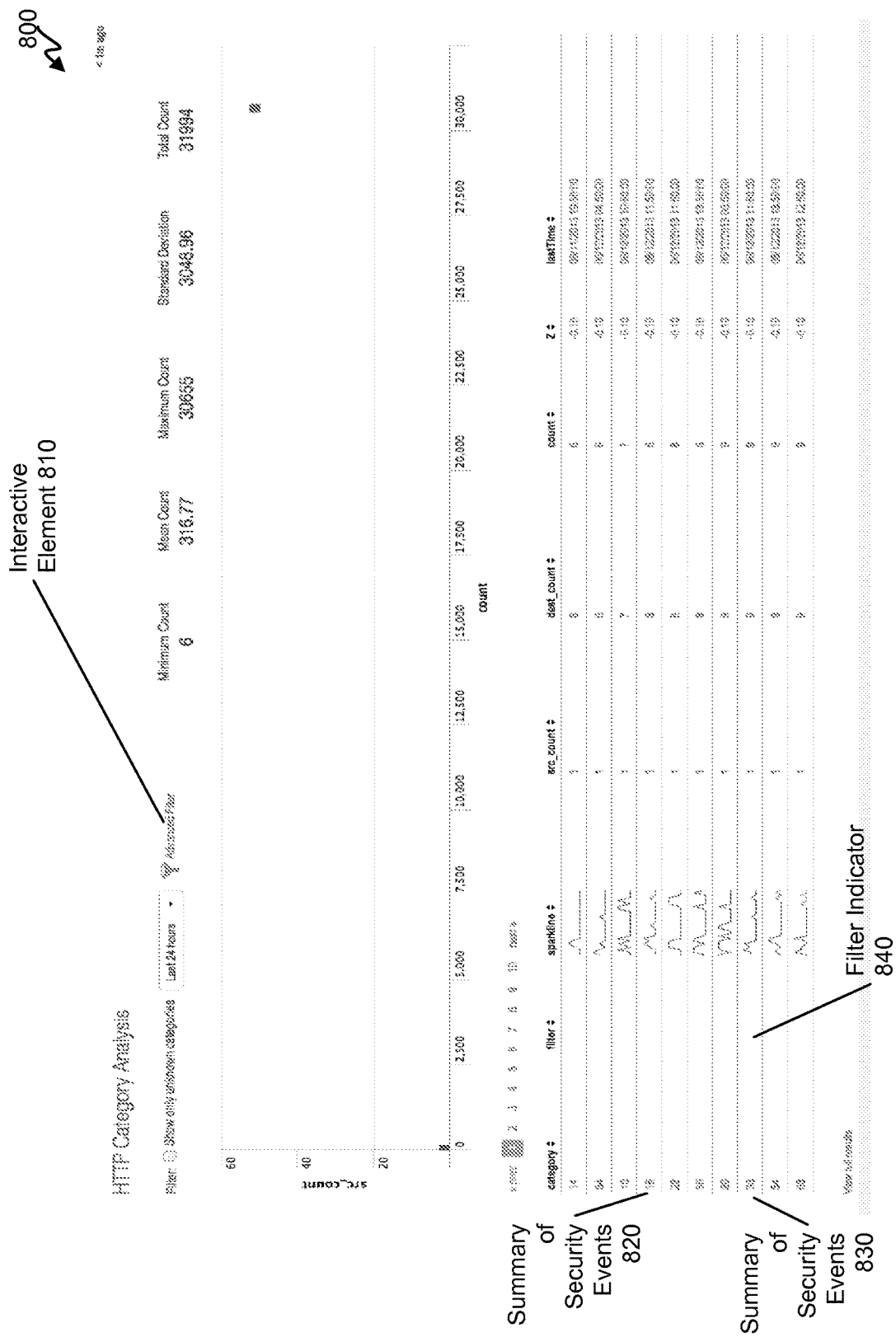
FIG. 8 shows a diagram illustrating an embodiment of a graphical interface presented by a security monitoring system.

Now turning to FIG. 8, a diagram illustrating an embodiment of a graphical interface 800 presented by a security monitoring system is shown. The graphical interface 800 may be presented by the security monitoring system 150 of FIG. 1 or the security monitoring system 200 of FIG. 2. The graphical interface 800 is an example of a graphical interface that may be generated by the display interface engine 225 of FIG. 2. As shown, the graphical interface 800 presents information about events associated with network traffic. Specifically, the graphical interface 800 presents information about HTTP activity identified in time stamped events.

The graphical interface 800 may include information about one or more groups of security events, each event identified based on having a field specified in a criteria for events related to HTTP activity indicative of network security (e.g., unknown HTTP traffic). The graphical interface 800 illustrates representative summaries including a summary of a group of security events 820 and a summary of a group of security events 830. While the representative summaries 820, 830 are illustrated, the graphical interface 800 may display other summaries of events. In the example illustrated in FIG. 8, each of the summaries 820 and 830 may be associated with a group of security events determined by the security event filtering system 232 for the respective summaries 820, 830. The group of security events associated with the summary 820, 830, respectively, has one or more fields, such as a count field ("count") and a source field ("src") that satisfy criteria for HTTP activity. The security event filtering system 232 may define the criteria determine the security events identified for each of the summaries 820, 830 based on satisfaction of criteria for identifying a particular number of HTTP requests during a 24 hour time period. Such criteria may enable identification of a sharp increase in HTTP requests from a particular source during a time period, which may be suggestive of a potential issue relating unknown HTTP requests. The security events that specify the criteria may be grouped into individual summaries 820, 830 based on having distinct values for the destination field. Each of the summaries 820, 830 may include information summarizing the security event for the respective summaries 820, 830.

In a particular embodiment, the graphical interface may include one or more interactive elements to control selective filtering as enabled by the security filtering system 232. The selective filtering may enable whitelisting or blacklisting of events. For example, the graphical interface 800 may include an interactive element 810. Selection of the interactive element 810 may cause the security filtering system 232 to present a display (e.g., a "filter panel"), such as a display shown in FIG. 6 described herein, that enables a user to remove (whitelist) or modify (blacklist) the summaries 820, 830 in the graphical interface 800. Details of features and functions of the display presented in response to selection of the interactive element 810 may be described in further detail with respect to FIG. 6. Although not shown, the graphical interface may include one or more interactive elements, such as a modify element and a remove element for selective filtering as described with respect to FIG. 4. In the example illustrated in FIG. 8, the summaries 820, 830 may include a filter field ("filter") that identifies whether the summary 820, 830 has been blacklisted and/or whitelisted.

In particular embodiments, the graphical interface 800 presents additional information based on the security events corresponding to the summaries including the summaries 820, 830. The graphical interface may present a chart displaying new HTTP activity as a function of a number of HTTP requests and a source of the HTTP requests. These statistics may assist in the identification of a trend of security events associated with HTTP activity. Further, the summary of security events included in the graphical interface 800 may be useful for identification of a count of requests by a particular unidentified source.

Figure 9:
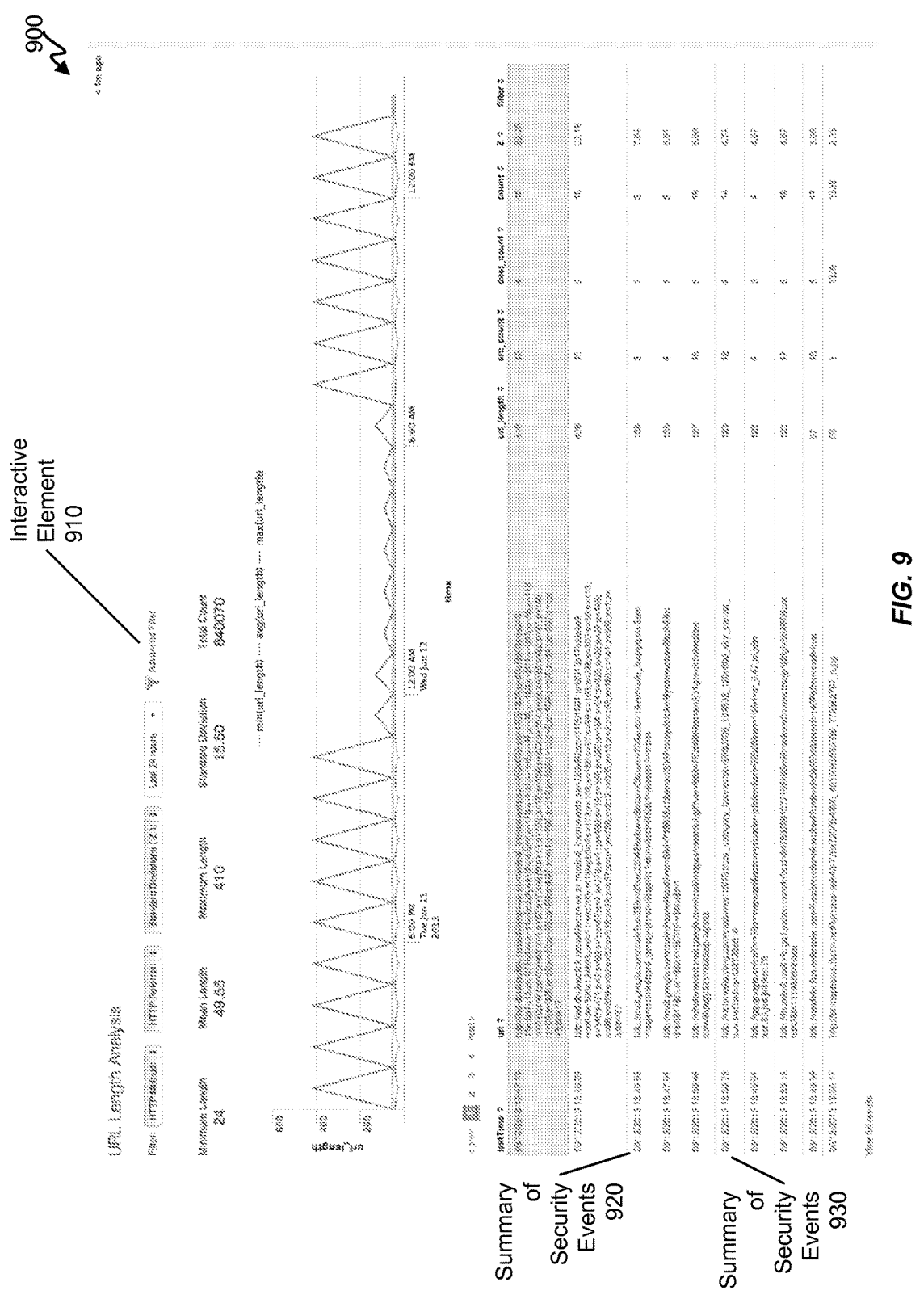

Now turning to FIG. 9, a diagram illustrating an embodiment of a graphical interface 800 presented by a security monitoring system is shown. The graphical interface 900 may be presented by the security monitoring system 150 of FIG. 1 or the security monitoring system 200 of FIG. 2. The graphical interface 900 is an example of a graphical interface that may be generated by the display interface engine 225 of FIG. 2. As shown, the graphical interface 900 presents information about events associated with network traffic. Specifically, the graphical interface 900 presents information about URL strings identified in time stamped events.

The graphical interface 900 may include information about one or more groups of security events, each event identified based on having a field specified in a criteria for events related to URL strings indicative of network security (e.g., malicious URL string). The graphical interface 900 illustrates representative summaries including a summary of a group of security events 920 and a summary of a group of security events 930. While the representative summaries 920, 930 are illustrated, the graphical interface 900 may display other summaries of events. In the example illustrated in FIG. 9, each of the summaries 920 and 930 may be associated with a group of security events determined by the security event filtering system 232 for the respective summaries 920, 930. The group of security events associated with the summary 920, 830, respectively, has one or more fields, such as a count field ("count"), a uniform resource locator (URL) field ("url", and a URL length field ("url length") that satisfy criteria for analysis of URL strings. The security event filtering system 232 may define the criteria to determine the security events identified for each of the summaries 920, 930. The criteria may be defined to identify a count of HTTP activity involving URL strings with a particular length. Such criteria may enable identification of a HTTP activity using a URL string that may contain malicious information as indicated by a length or a particular string identified in the URL. For example, the criteria may include a URL string having a particular length because a URL string of a particular length may suggest that the URL string contains an embedded SQL command (e.g., an SQL command for SQL injections), cross-site scripting (XSS), embedded command and control (C&C) instructions, or other malicious content. The security events that specify the criteria may be grouped into individual summaries 920, 930 based on having distinct values for the destination field. Each of the summaries 920, 930 may include information summarizing the security event for the respective summaries 920, 930.

In a particular embodiment, the graphical interface 900 may include one or more interactive elements to control selective filtering as enabled by the security filtering system 232. The selective filtering may enable whitelisting or blacklisting of events. For example, the graphical interface 900 may include an interactive element 910. Selection of the interactive element 910 may cause the security filtering system 232 to present a display (e.g., a "filter panel"), such as a display shown in FIG. 6 described herein, that enables a user to remove (whitelist) or modify (blacklist) the summaries 920, 930 in the graphical interface 900. Details of features and functions of the display presented in response to selection of the interactive element 810 may be described in further detail with respect to FIG. 6. Although not shown, the graphical interface may include one or more interactive elements, such as a modify element and a remove element for selective filtering as described with respect to FIG. 4.

In particular embodiments, the graphical interface 900 presents additional information based on the security events corresponding to the summaries including the summaries 920, 930. The graphical interface may present a chart displaying activity over a period of time corresponding to a particular length of a URL string. These statistics may assist in the identification of a trend of security events associated with HTTP requests for URL strings have a particular length suggestive of malicious activity. Further, the summary of security events included in the graphical interface 900 may be useful for identification of activity using a particular length URL string during a particular time.

Figure 10:
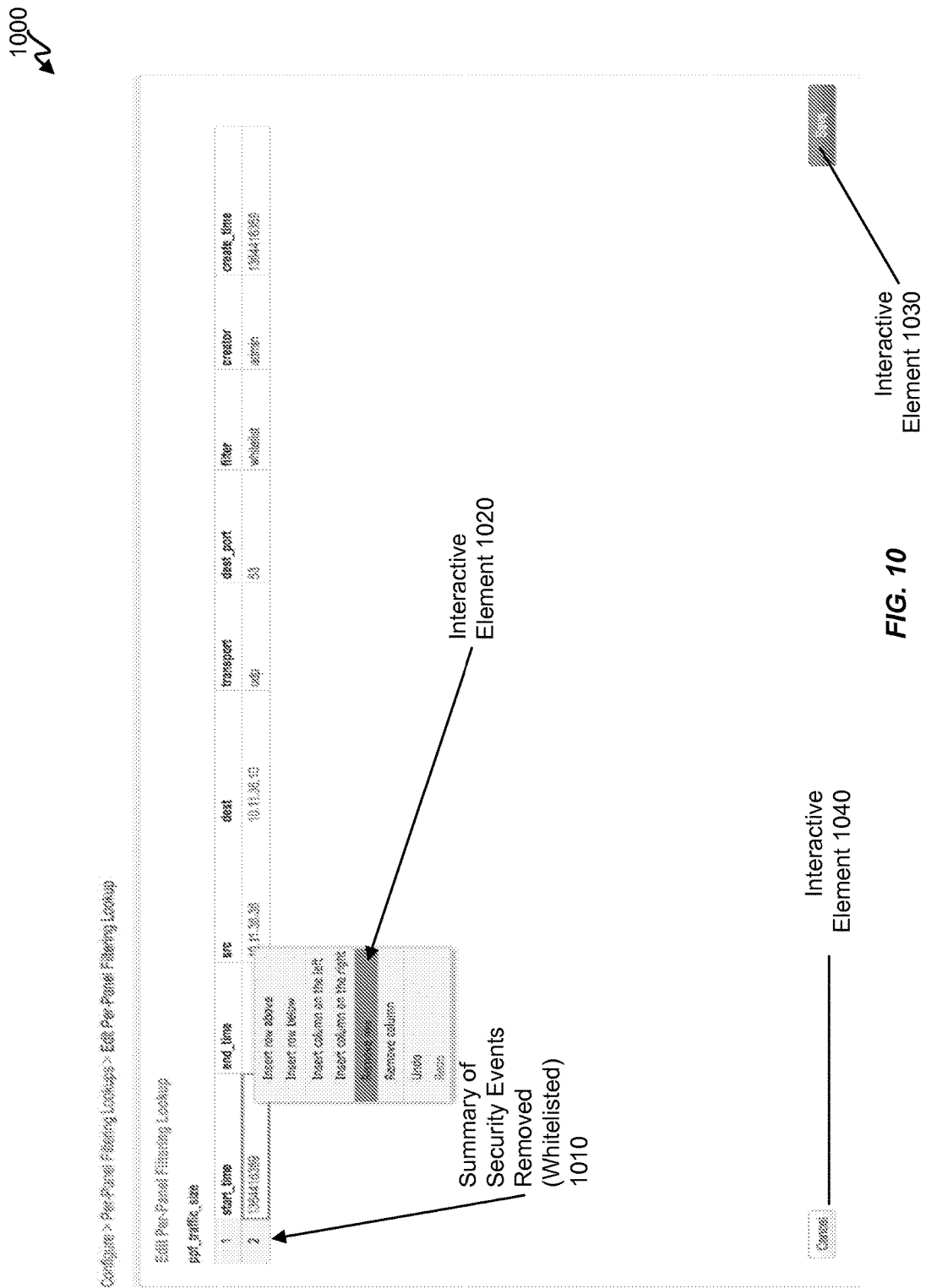
FIG. 10 shows a diagram illustrating an embodiment of a display presented by a security monitoring system.

FIG. 10 shows a diagram illustrating an embodiment of a display 1000 presented by a security monitoring system. The display 1000 (e.g., "filter panel") may be presented by the security monitoring system 150 of FIG. 1 or the security monitoring system 200 of FIG. 2. Specifically, the display 1000 may be generated and presented by the display interface engine 225 of FIG. 2.

The display 1000 enables a user to manage summaries that have been removed (whitelisted) from a graphical interface that displays the summaries, such as one or more of the graphical interfaces 400, 500, 700, 800, 900. In particular embodiments, a graphical interface displaying a summary of security events may include an interactive element that causes the display 1000 to be presented. To illustrate, the display 1000 presents a summary of a group of security events 1010 that has been removed from the graphical interface, such as the graphical interface 500. The summary 1010 may display all or a portion of a corresponding summary presented in the graphical interface 500. The summary 1010 may be associated with an interactive element 1020 (e.g., a selectable control) that when interacted with presents one or more options for managing the summary 1010. For example, the interactive element 1020 may include an option to add the summary 1010 ("unwhitelist") the summary by adding it back to the graphical interface 500. In particular embodiments, the display 1000 may include additional interactive elements such as an interactive element 1030 and interactive element 1040. Interactive element 1030 may enable a user to confirm (e.g., save) an interaction on the interactive element 1020. In response to interaction with the interactive element 1030, the display interface engine 235 may cause the summary 1020 to be added back to the graphical interface 500. The interactive element 1040 may enable a user to cancel interaction with the interactive element 1020.

The panel 1000 is particularly useful as it enables a user to identify summaries that have been whitelisted, which may otherwise be forgotten once removed from a graphical interface. In an environment where the graphical interface presents many summaries, a user may forget or mistakenly remove one or more summaries. The display 1000 enables the user to undo what was whitelisted before. In some cases, a user may desire to undo a whitelisted summary after further determination that the whitelisted summary may pose a security threat.

Figure 11:
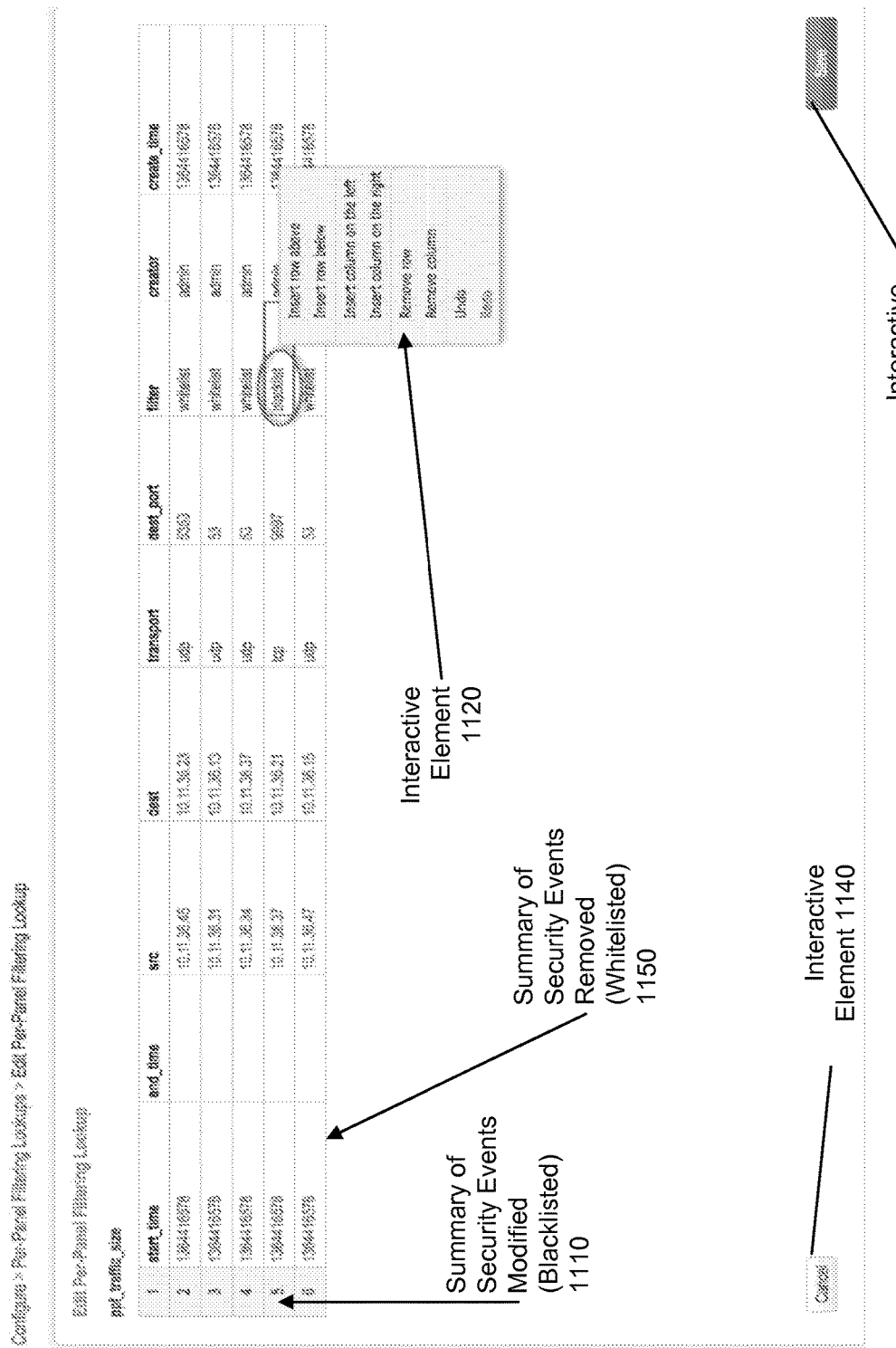
FIG. 11 shows a diagram illustrating an embodiment of a display presented by a security monitoring system.

FIG. 11 shows a diagram illustrating an embodiment of a display 1100 presented by a security monitoring system. The display 1100 (e.g., "filter panel") may be presented by the security monitoring system 150 of FIG. 1 or the security monitoring system 200 of FIG. 2. Specifically, the display 1100 may be generated and presented by the display interface engine 225 of FIG. 2.

The display 1100 enables a user to manage summaries that have been removed (whitelisted) and/or summaries that have been modified (blacklisted) from a graphical interface that displays the summaries, such as shown in particular embodiments of graphical interfaces 400, 500, 700, 800, 900. In particular embodiments, a graphical interface displaying a summary of a group of security events may include an interactive element that causes the display 1100 to be presented. To illustrate, the display 1100 presents a summary of a group of security events 1110 that has been modified (blacklisted) from a graphical interface, such as the graphical interface 500. The summary 1110 may display all or a portion of a corresponding summary presented in the graphical interface 500. The display may additionally, or in the alternative, present a summary of a group of security events 1150 that has been removed (whitelisted) from a graphical interface, such as the graphical interface 500. The summary 1150 may display all or a portion of a corresponding summary presented in the graphical interface 500.

The summary 1110 and/or the summary 1150 may include or may be associated with one or more interactive elements, such as a representative interactive element 1120 (e.g., a selectable control). The interactive element 1120 may include one or more options for managing the summary 1110 and/or the summary 1150. For example, the interactive element 1120 include an include an option to remove the summary 1110 from the display 1000, which causes modification of the summary in the graphical interface 500 to be undone. In another example, the interactive element 1120 may include an option to remove the summary 1150 from the display, which causes the summary 1150 to be added back to the graphical interface 500.

In particular embodiments, the display 1100 may include additional interactive elements such as an interactive element 1130 and interactive element 1140. Interactive element 1130 may enable a user to confirm (e.g., save) an interaction on the interactive element 1120. In response to interaction with the interactive element 1130, the display interface engine 235 may cause the summary 1120 to be added back to the graphical interface 500. The interactive element 1140 may enable a user to cancel interaction with the interactive element 1120.

The panel 1100 enables a user to identify summaries that have been whitelisted and/or blacklisted. Using the panel 1100, a user to change a decision made for whitelisting or blacklisting a summary in the event that further investigation of the summary 1110 or the summary 1150 changes.

Figure 12:
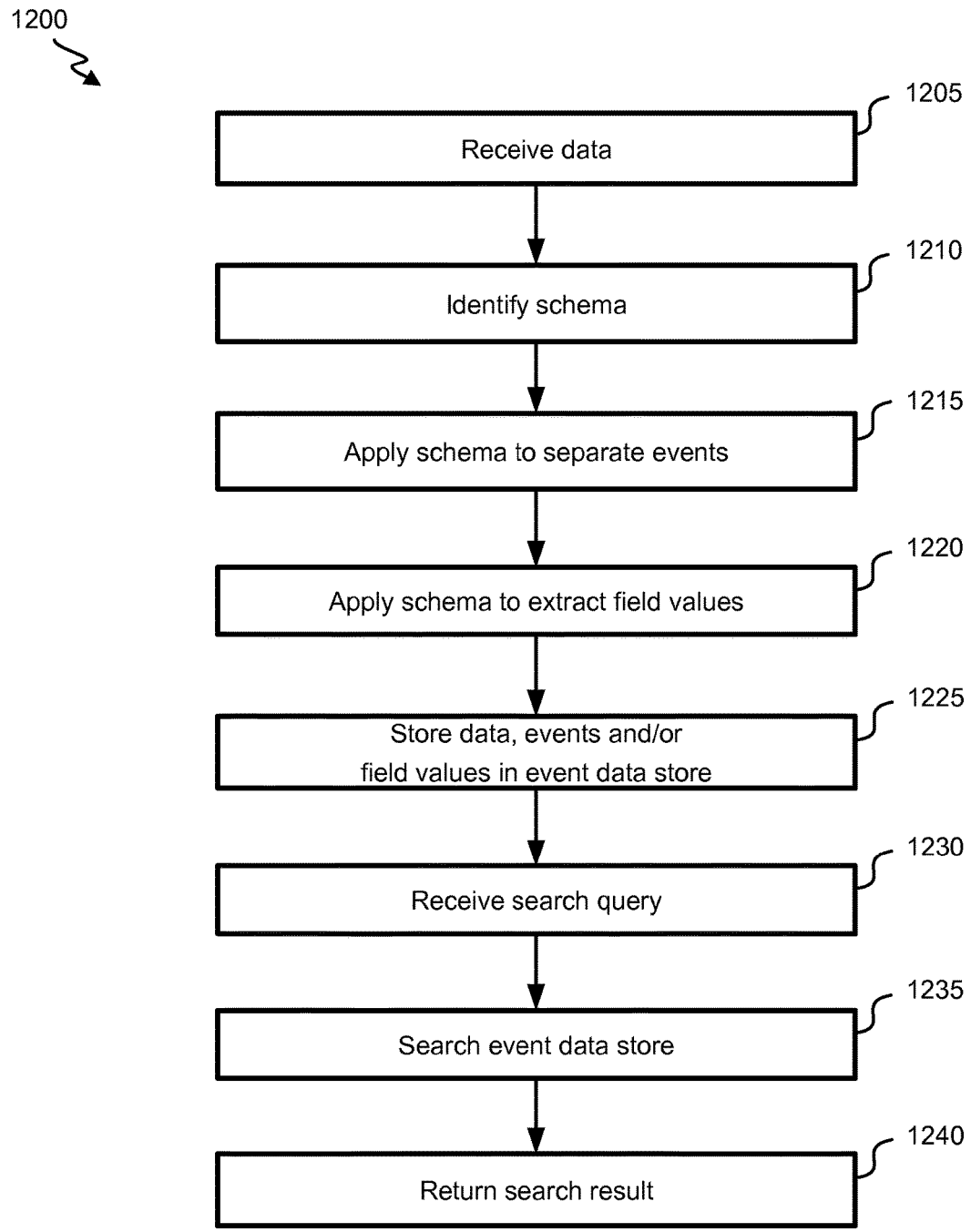
FIG. 12 illustrates a flowchart of an embodiment of a process performed by a data management system.

FIG. 12 illustrates a flowchart of an embodiment of a process 1200 performed by a data management system. For example, the process 1200 may be performed by the data management system 222 of FIG. 2 and/or the data management system 300 of FIG. 3.

Process 1200 begins at block 1205, where data intake 305 receives data. Schema engine 310 identifies an applicable schema at block 1210. Event parser 320 applies the schema to separate the data into events at block 1215. Field extractor 325 applies the schema to extract field values from the events at block 1220. Storage engine 330 stores raw data, events and/or field values in event data store 335 (e.g., by assigning the data, events and/or field values to buckets based on particular field values) at block 1225.

Search engine 340 receives a search query from a searcher (e.g., client or user) at block 1230. The search query can include one or more criteria which can specify or constrain field values. Search engine 340 searches event data store 335 at block 1235. The search can entail searching only some of event data store 335 (e.g., that include field values of interest, such as information indicative of a security threat). The search can produce identifiers of events of interest. Search engine 340 may then collect other field values for those events of interest. A search result can include the collected other field values and/or a processed version thereof. Search engine 340 returns the search result to the searcher at block 1240.

It will be appreciated that the data management system 222 of FIG. 2, the data management system 300 of FIG. 3, and/or the process 1200 may be modified such that schema is not bound to data (or only a portion of the schema is bound to data) immediately following intake. For example, schema could instead be bound to prior to storage of the data, during storage of the data, or at a query time (e.g., subsequent to block 1230 of process 1200). Splunk Enterprise produced by Splunk Inc. of San Francisco is an exemplary system for creating a time series data store using a late binding schema. For example, Splunk Enterprise creates a time series data store by segmenting received raw data into events, extracting timestamps from each event, and storing each event in one or more time series data stores that are searchable by timestamp (along with other metadata such as source, type, and the like). Splunk Enterprise allows later schema development of fields any time up to query time.

The data management system 222, the data management system 300, and/or the process 1200 can be modified to include features, feature connections and/or flows as described in Carasso, David. *Exploring Splunk Search Processing Language (SPL) Primer and Cookbook*. New York: CITO Research, 2012 and/or as described in Ledion Bitincka, Archana Ganapathi, Stephen Sorkin, and Steve Zhang. *Optimizing data analysis with a semi-structured time series Database*. In SLAML, 2010. Each of these references is hereby incorporated by reference in its entirety for all purposes.

Figure 13:
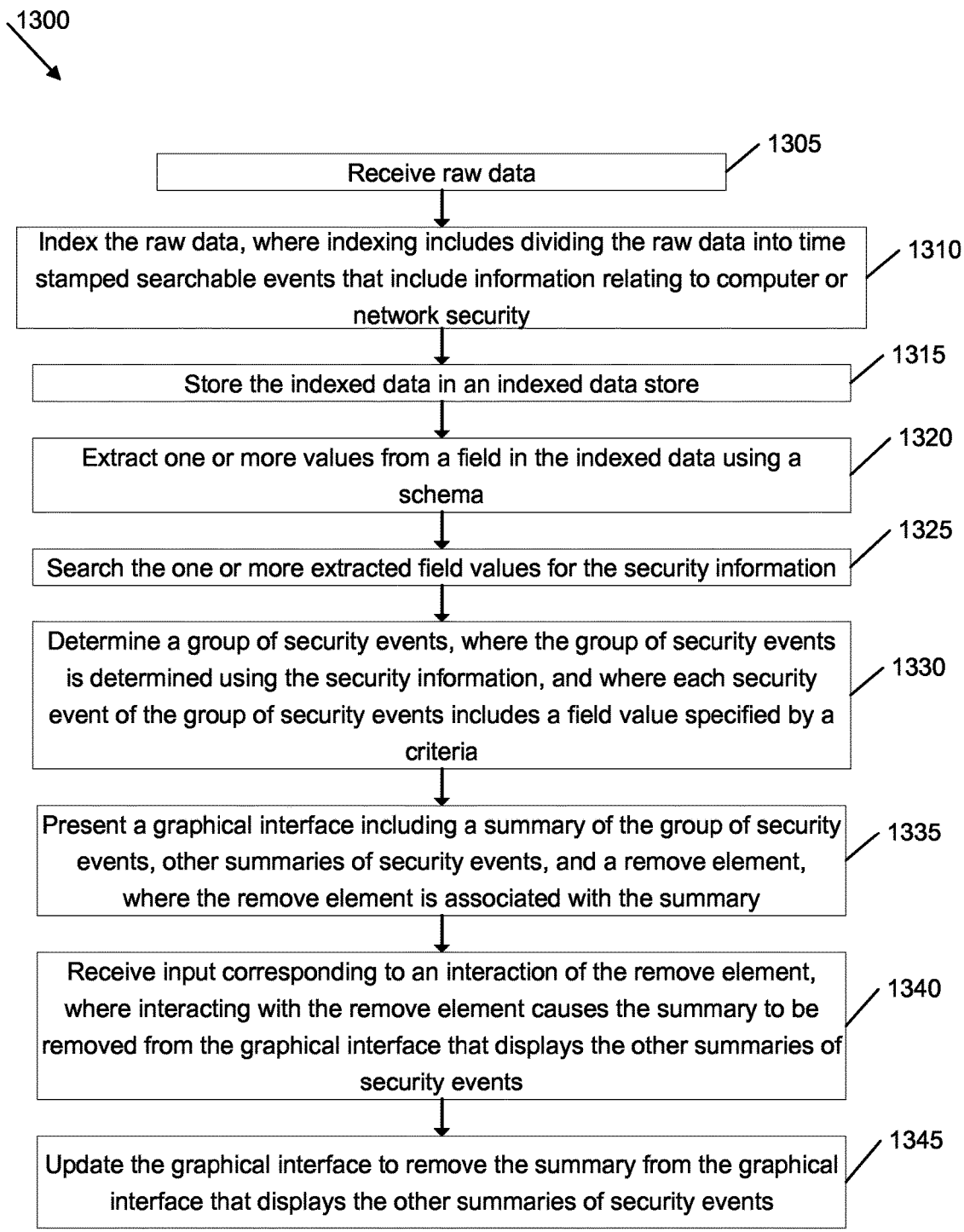
FIG. 13 illustrates a flowchart of an embodiment of a process performed by a security monitoring system.

FIG. 13 illustrates a flowchart of an embodiment of a process 1300 performed by a security monitoring system. For example, the process 1300 may be performed by the security monitoring system 150 of FIG. 1 and/or the security monitoring system 200 of FIG. 2.

The process 1300 begins at block 1305, where raw data is received from a data store. The process continues to block 1310 where the raw data is indexed. The schema engine 310 performs indexing of the raw data which may include dividing the raw data into time stamped searchable events. The time stamped searchable events may include information relating to computer or network security. The security information correspond to one or more fields in time stamped events. The one or more fields in the time stamped events may include information related to computer or network security. At block 1315, the schema engine 310 stores index data (based on indexing of the raw data) for each event in an appropriate index in an event data store 215.

The process 1300 continues at block 1320, where one or more values are extracted from a field in the index data for each of the time stamped events using a schema. The schema may be applied at query time. An applicable schema can be used to extract specific field values based on a structure imposed on the indexed data. The field extractor 325 may extract one or more values from time stamped events indexed by the schema engine 310.

At block 1325, the process 1300 includes searching one or more extracted field values (of the index data) for the security information. For example, the filtering engine 230 of FIG. 2 may request the search engine 220 of FIG. 2 to search the one or more values extracted from a field of the index data for the security information.

At block 1330, the process 1300 includes determining a group of security events. The group of security events is determined using the security information. Each security event of the group of security events includes a field value specified by a criteria. To illustrate, the event aggregator engine 235 of FIG. 2 may determine a group of security events identified from the time stamped search events for which the filtering engine 230, at block 1235, extracted values for a field. Each of the group of security events corresponds to a time stamped events. The event aggregator engine 235 may identify the time stamped events within the time period that have an extracted field value that satisfies the criteria. The criteria may include a value for one or more fields that relates to events associated with computer or network security. For example, the criteria may include a particular length of a uniform resource locator (URL) string, a source address, or both. The criteria may be established to identify events from a particular source of the source address that may pose a security threat by sending requests using an URL string of a particular length. Such events may be investigated further by being gathered for further analysis. The event aggregator engine 235 may determine the group of security events based on the time stamped events having a field specifying the criteria.

The process 1300 continues to block 1335 where a graphical interface is presented including a summary of the group of security events, other summaries of security events, and a remove element. The remove element is associated with the summary. For example, the display interface engine 225 of FIG. 2 may generate a graphical interface 192 of FIG. 1 to present a summary of the group of security events determined at block 1330. The graphical interface 192 may include other summaries of security events. The graphical interface 192 may include a remove element (e.g. a "whitelist" selection control) that is an interactive element associated with the summary. For example, the summary may include a summary of information based on time stamped events corresponding to the group of security events of the summary. The other summaries of the security events may include similar information as the summary or alternatively, may include other information specific to events associated with the other summaries. Examples of information included in the summary and the other summaries is described with respect to FIGS. 2, 4, 5, and 7-9.

At block 1340, input is received corresponding to an interaction of the remove element. Interaction with the remove element causes the summary to be removed (or "whitelisted") from the graphical interface displaying the other summaries of security events. For example, the display interface engine 225 of FIG. 2 may receive input corresponding to an interaction of the remove element 440 of FIG. 4 associated with the summary of security events 410. In response to the input, the display interface engine 225 may remove the summary 410 from the graphical interface 400. The graphical interface may still display the other summaries 420, 430.

At block 1345, the graphical interface is updated to remove the summary from the graphical interface that displays the other summaries of security events. For example, the display interface engine 235 of FIG. 2 may remove the summary 410 of FIG. 4 from the graphical interface 400 that display the other summaries 420, 430.

Figure 14:
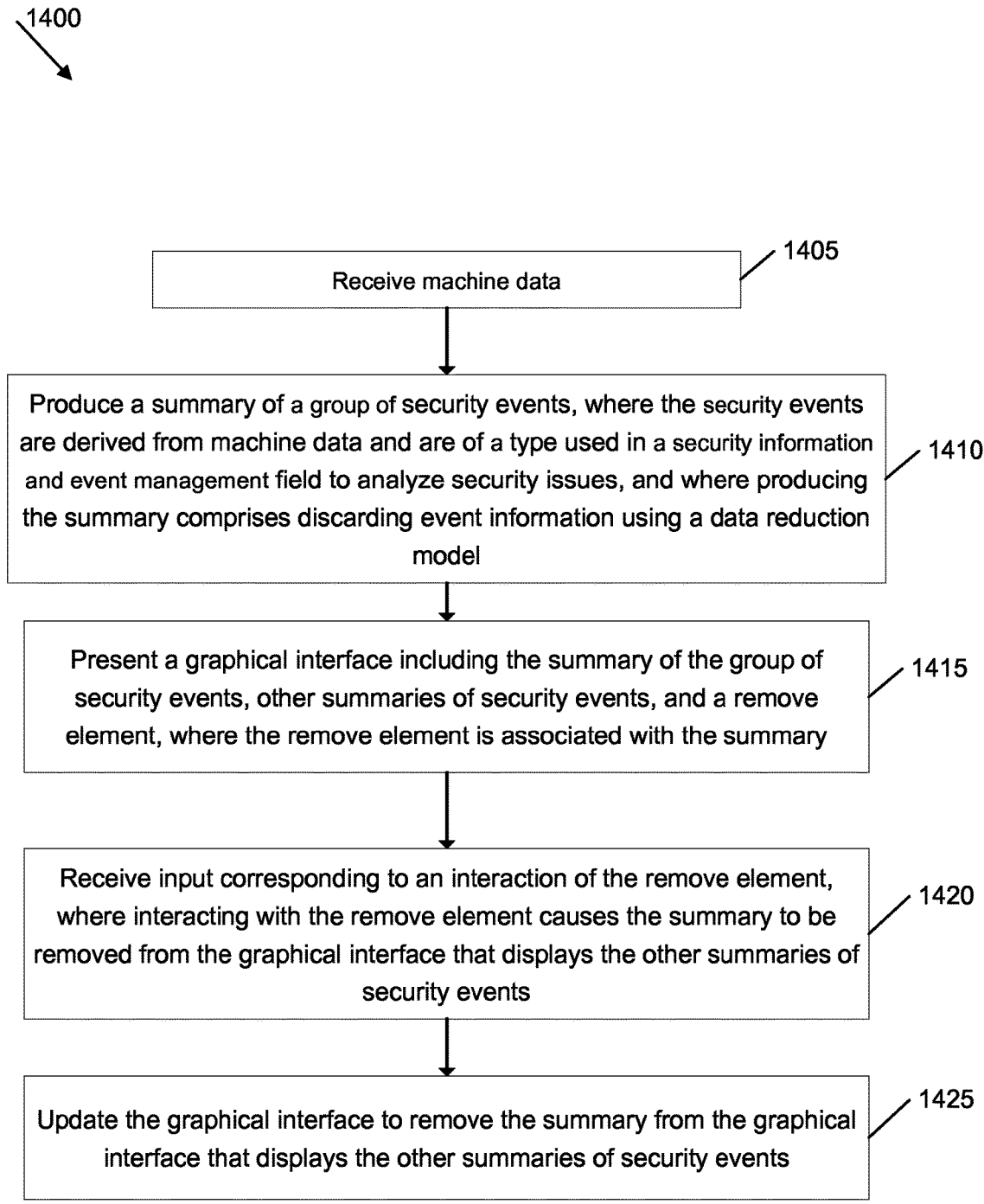
FIG. 14 illustrates a flowchart of an embodiment of a process performed by a security monitoring system.

FIG. 14 illustrates a flowchart of an embodiment of a process 1400 performed by a security monitoring system. For example, the process 1400 may be performed by the security monitoring system 150 of FIG. 1 and/or the security monitoring system 200 of FIG. 2.

The process 1400 begins at block 1405, where machine data is received from a data store. The process continues to block 1410 where a summary of a group of security events is produced. The security events are derived from machine data and are of a type used in a security information and event management field to analyze security issues. Producing the summary comprises discarding event information using a data reduction model.

At block 1415, the process 1400 includes presenting a graphical interface including the summary of the group of security events, other summaries of security events, and a remove element. The remove is associated with the summary. Continuing to block 1420, the process 1400 includes receiving input corresponding to an interaction of the remove element. Interacting with the remove element causes the summary to be removed from the graphical interface that displays the other summaries of security events. At block 1425, the graphical interface is updated to remove the summary from the graphical interface that displays the other summaries of security events.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, architecture provider or reviewer, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method, comprising:
creating an event group from a plurality of time-stamped, searchable events stored in a field-searchable, non-tabular data store, each event in the event group having a portion of raw machine data reflecting activity in an information technology environment and matching criteria relating to one or more field values extracted from one or more fields present in the portion of raw machine data, wherein the criteria is evaluated using an extraction rule applied to at least a portion of the plurality of time-stamped, searchable events;
determining an event group summary, the summary summarizing field values from one or more fields of the events in the event group;
causing display of a graphical user interface displaying a plurality of event group summaries including the event group summary;
based on user input in response to the display of the graphical user interface, changing a visual appearance of a selected event group summary among the displayed plurality of event group summaries to indicate that the selected event group summary is a security threat or removing the selected event group summary from the displayed plurality of event group summaries indicating that the selected event group summary is not a security threat;
wherein the method is performed by one or more computing devices.

2. The method as recited in claim 1, wherein at least one event group summary of the displayed event group summaries includes domain activity information.

3. The method as recited in claim 1, further comprising:
causing display of a second graphical user interface displaying a second plurality of event group summaries, wherein each event group summary in the second plurality of event group summaries was removed from the displayed plurality of event group summaries indicating that each event group summary in the second plurality of event group summaries is not a security threat.

4. The method as recited in claim 1, further comprising:
receiving log data;
organizing the received log data into the plurality of time-stamped, searchable events, wherein an event is comprised of at least a portion of one or more lines of data within the log data.

5. The method as recited in claim 1, wherein the extraction rule is a late binding schema.

6. The method as recited in claim 1, wherein each event of the plurality of time-stamped, searchable events is associated with a time stamp, and wherein the event group summary encompasses events having time stamps within a specified time period.

7. The method as recited in claim 1, further comprising:
removing an event from the plurality of time-stamped, searchable events when the event is not recognized as notable.

8. The method as recited in claim 1, further comprising:
segmenting stored raw data into the plurality of time-stamped, searchable events, wherein each event in the plurality of time-stamped, searchable events includes information relating to security aspects of an information technology system.

9. The method as recited in claim 1, wherein the event group summary includes a count of a number of events in the event group summary.

10. An apparatus, comprising:
an event group creator, implemented at least partially in hardware, that creates an event group from a plurality of time-stamped, searchable events stored in a field-searchable, non-tabular data store, each event in the event group having a portion of raw machine data reflecting activity in an information technology environment and matching criteria relating to one or more field values extracted from one or more fields present in the portion of raw machine data, wherein the criteria is evaluated using an extraction rule applied to at least a portion of the plurality of time-stamped, searchable events;
a summary creator, implemented at least partially in hardware, that determining an event group summary, the summary summarizing field values from one or more fields of the events in the event group;
a display generator, implemented at least partially in hardware, that causing display of a graphical user interface displaying a plurality of event group summaries including the event group summary;
wherein the display generator, based on user input in response to the display of the graphical user interface, changes a visual appearance of a selected event group summary among the displayed plurality of event group summaries to indicate that the selected event group summary is a security threat or removing the selected event group summary from the displayed plurality of event group summaries indicating that the selected event group summary is not a security threat.

11. The apparatus as recited in claim 10, wherein at least one event group summary of the displayed event group summaries includes domain activity information.

12. The apparatus as recited in claim 10, wherein the display generator, causes display of a second graphical user interface displaying a second plurality of event group summaries, wherein each event group summary in the second plurality of event group summaries was removed from the displayed plurality of event group summaries indicating that each event group summary in the second plurality of event group summaries is not a security threat.

13. The apparatus as recited in claim 10, further comprising:
a log data receiver, implemented at least partially in hardware, that receives log data;
an event creator, implemented at least partially in hardware, that organizes the received log data into the plurality of time-stamped, searchable events, wherein an event is comprised of at least a portion of one or more lines of data within the log data.

14. The apparatus as recited in claim 10, wherein the extraction rule is a late binding schema.

15. The apparatus as recited in claim 10, wherein each event of the plurality of time-stamped, searchable events is associated with a time stamp, and wherein the event group summary encompasses events having time stamps within a specified time period.

16. The apparatus as recited in claim 10, further comprising:

an data reducer, implemented at least partially in hardware, that removes an event from the plurality of time-stamped, searchable events when the event is not recognized as notable.

17. The apparatus as recited in claim 10, further comprising:
an event creator, implemented at least partially in hardware, that segments stored raw data into the plurality of time-stamped, searchable events, wherein each event in the plurality of time-stamped, searchable events includes information relating to security aspects of an information technology system.

18. The apparatus as recited in claim 10, wherein the event group summary includes a count of a number of events in the event group summary.

19. One or more non-transitory computer-readable storage media, storing one or more sequences of instructions, which when executed by one or more processors cause performance of:
creating an event group from a plurality of time-stamped, searchable events stored in a field-searchable, non-tabular data store, each event in the event group having a portion of raw machine data reflecting activity in an information technology environment and matching criteria relating to one or more field values extracted from one or more fields present in the portion of raw machine data, wherein the criteria is evaluated using an extraction rule applied to at least a portion of the plurality of time-stamped, searchable events;
determining an event group summary, the summary summarizing field values from one or more fields of the events in the event group;
causing display of a graphical user interface displaying a plurality of event group summaries including the event group summary;
based on user input in response to the display of the graphical user interface, changing a visual appearance of a selected event group summary among the displayed plurality of event group summaries to indicate that the selected event group summary is a security threat or removing the selected event group summary from the displayed plurality of event group summaries indicating that the selected event group summary is not a security threat.

20. The one or more non-transitory computer-readable storage media as recited in claim 19, wherein at least one event group summary of the displayed event group summaries includes domain activity information.

21. The one or more non-transitory computer-readable storage media as recited in claim 19, wherein the one or more sequences of instructions, when executed by the one or more processors cause further performance of:
causing display of a second graphical user interface displaying a second plurality of event group summaries, wherein each event group summary in the second plurality of event group summaries was removed from the displayed plurality of event group summaries indicating that each event group summary in the second plurality of event group summaries is not a security threat.

22. The one or more non-transitory computer-readable storage media as recited in claim 19, wherein the one or more sequences of instructions, when executed by the one or more processors cause further performance of:
receiving log data;
organizing the received log data into the plurality of time-stamped, searchable events, wherein an event is comprised of at least a portion of one or more lines of data within the log data.

23. The one or more non-transitory computer-readable storage media as recited in claim 19, wherein the extraction rule is a late binding schema.

24. The one or more non-transitory computer-readable storage media as recited in claim 19, wherein each event of the plurality of time-stamped, searchable events is associated with a time stamp, and wherein the event group summary encompasses events having time stamps within a specified time period.

25. The one or more non-transitory computer-readable storage media as recited in claim 19, wherein the one or more sequences of instructions, when executed by the one or more processors cause further performance of:
removing an event from the plurality of time-stamped, searchable events when the event is not recognized as notable.

26. The one or more non-transitory computer-readable storage media as recited in claim 19, wherein the one or more sequences of instructions, when executed by the one or more processors cause further performance of:
segmenting stored raw data into the plurality of time-stamped, searchable events, wherein each event in the plurality of time-stamped, searchable events includes information relating to security aspects of an information technology system.

27. The one or more non-transitory computer-readable storage media as recited in claim 19, wherein the event group summary includes a count of a number of events in the event group summary.

\* \* \* \* \*